(12) United States Patent
Koenig et al.

(10) Patent No.: US 8,574,690 B2
(45) Date of Patent: *Nov. 5, 2013

(54) PRINTABLE SUBSTRATES WITH IMPROVED DRY TIME AND ACCEPTABLE PRINT DENSITY BY USING MONOVALENT SALTS

(75) Inventors: Michael F. Koenig, Loveland, OH (US); Steven D. Schultz, Cincinnati, OH (US); Krshna Pamidimukkala, Paramus, NJ (US); Sen Yang, Nanuet, NY (US)

(73) Assignee: International Paper Company, Memphis, TN (US)

( * ) Notice: Subject to any disclaimer, the term of this patent is extended or adjusted under 35 U.S.C. 154(b) by 307 days.

This patent is subject to a terminal disclaimer.

(21) Appl. No.: 12/640,756

(22) Filed: Dec. 17, 2009

(65) Prior Publication Data

US 2011/0151148 A1 Jun. 23, 2011

(51) Int. Cl.
  *B41M 5/00* (2006.01)
  *B41M 5/50* (2006.01)
  *B41M 5/52* (2006.01)
  *C04B 41/00* (2006.01)

(52) U.S. Cl.
  CPC .............. *B41M 5/508* (2013.01); *B41M 5/5218* (2013.01); *B41M 5/52* (2013.01); *B41M 5/5245* (2013.01); *C04B 41/009* (2013.01)
  USPC ................... 428/32.18; 428/32.21; 428/32.3; 427/243

(58) Field of Classification Search
  USPC .................... 428/32.18, 32.21, 32.3; 427/243
  See application file for complete search history.

(56) References Cited

U.S. PATENT DOCUMENTS

| 3,293,114 A | 12/1966 | Kenaga et al. |
| 3,533,908 A | 10/1970 | Hoogsteen |
| 3,556,934 A | 1/1971 | Meyer |

(Continued)

FOREIGN PATENT DOCUMENTS

| EP | 0629741 B1 | 12/1994 |
| EP | 0652324 | 5/1995 |

(Continued)

OTHER PUBLICATIONS

Handbook of Pulp & Paper Terminology, Gary A. Smook—pp. 283-285, Aug. 1996.

(Continued)

*Primary Examiner* — Betelhem Shewareged
(74) *Attorney, Agent, or Firm* — Thomas W. Barnes, III; Erie W. Guttao

(57) ABSTRACT

An article in the form of a paper substrate having a first surface and a second surface; an internal paper sizing agent present in an amount sufficient to impart to the paper substrate an HST value of from about 50 to about 250 seconds; and a metal salt drying agent having at least about 20% by weight of one or more monovalent metal drying salts, wherein the metal salt drying agent is present on at least one of the first and second surfaces in an amount sufficient to provide a percent ink transferred ("IT %") value equal to or less than about 65% and to provide a black print density value of at least about 1.45. Also, a method for treating the internally sized paper substrate having the HST value of from about 50 to about 250 seconds with the metal salt drying agent.

36 Claims, 13 Drawing Sheets

(56) References Cited

U.S. PATENT DOCUMENTS

| | | |
|---|---|---|
| 3,600,385 A | 8/1971 | Loffelman |
| 3,719,514 A | 3/1973 | Taylor |
| 3,956,283 A | 5/1976 | Fleck |
| 4,040,900 A | 8/1977 | Mazzarella et al. |
| 4,133,688 A | 1/1979 | Sack |
| 4,251,824 A | 2/1981 | Hara et al. |
| 4,279,794 A | 7/1981 | Dumas |
| 4,381,185 A | 4/1983 | Swanson et al. |
| 4,410,899 A | 10/1983 | Haruta et al. |
| 4,412,224 A | 10/1983 | Sugitani |
| 4,425,405 A | 1/1984 | Murakami et al. |
| 4,446,174 A | 5/1984 | Maekawa et al. |
| 4,478,910 A | 10/1984 | Oshima et al. |
| 4,481,244 A | 11/1984 | Haruta et al. |
| 4,483,889 A | 11/1984 | Andersson |
| 4,496,629 A | 1/1985 | Haruta et al. |
| 4,503,118 A | 3/1985 | Murakami et al. |
| 4,517,244 A | 5/1985 | Kobayashi et al. |
| 4,532,530 A | 7/1985 | Hawkins |
| 4,554,181 A | 11/1985 | Cousin et al. |
| 4,576,867 A | 3/1986 | Miyamoto |
| 4,601,777 A | 7/1986 | Hawkins et al. |
| 4,636,409 A | 1/1987 | Arai et al. |
| 4,721,655 A | 1/1988 | Trzasko |
| 4,740,420 A | 4/1988 | Akutsu et al. |
| 4,792,487 A | 12/1988 | Schubring et al. |
| 4,830,911 A | 5/1989 | Kojima et al. |
| 4,877,680 A | 10/1989 | Sakaki et al. |
| 4,908,240 A | 3/1990 | Auhorn et al. |
| 5,013,603 A | 5/1991 | Ogawa et al. |
| 5,125,996 A | 6/1992 | Campbell et al. |
| 5,163,973 A | 11/1992 | Ellis |
| 5,190,805 A | 3/1993 | Atherton et al. |
| 5,270,103 A | 12/1993 | Oliver et al. |
| 5,314,747 A | 5/1994 | Malhotra et al. |
| 5,320,902 A | 6/1994 | Malhotra et al. |
| 5,397,619 A | 3/1995 | Kuroyama et al. |
| 5,405,678 A | 4/1995 | Bilodeau |
| 5,429,860 A | 7/1995 | Held et al. |
| 5,457,486 A | 10/1995 | Malhotra et al. |
| 5,474,843 A | 12/1995 | Lambert et al. |
| 5,514,429 A | 5/1996 | Kamihgaraguchi et al. |
| 5,522,968 A | 6/1996 | Kuroyama et al. |
| 5,537,137 A | 7/1996 | Held et al. |
| 5,657,064 A | 8/1997 | Malhotra |
| 5,729,266 A | 3/1998 | Malhotra |
| 5,760,809 A | 6/1998 | Malhotra et al. |
| 6,022,104 A | 2/2000 | Lin et al. |
| 6,077,642 A | 6/2000 | Ogata et al. |
| 6,123,760 A | 9/2000 | Varnell |
| 6,162,328 A | 12/2000 | Cenisio et al. |
| 6,207,258 B1 | 3/2001 | Varnell |
| 6,350,507 B1 | 2/2002 | Iwamoto et al. |
| 6,383,612 B1 | 5/2002 | Waller, Jr. |
| 6,414,055 B1 | 7/2002 | Lauzon |
| 6,485,139 B1 | 11/2002 | Lavery et al. |
| 6,528,119 B1 | 3/2003 | MacMillan |
| 6,686,054 B2 | 2/2004 | Nigam |
| 6,761,977 B2 | 7/2004 | Nigam |
| 6,764,726 B1 | 7/2004 | Yang et al. |
| 6,777,040 B2 | 8/2004 | Tatsuhashi et al. |
| 6,786,586 B2 | 9/2004 | Koga et al. |
| 6,880,928 B2 | 4/2005 | Hosoi et al. |
| 6,977,100 B2 | 12/2005 | Kondo et al. |
| 7,070,727 B2 | 7/2006 | Callihoun et al. |
| 7,172,651 B2 | 2/2007 | Chen et al. |
| 7,381,300 B2 | 6/2008 | Skaggs et al. |
| 7,510,750 B2 | 3/2009 | Koga et al. |
| 7,553,395 B2 | 6/2009 | Stoffel et al. |
| 7,582,188 B2 | 9/2009 | Stoffel et al. |
| 8,012,551 B2 | 9/2011 | Song et al. |
| 8,123,907 B2 | 2/2012 | Stoffel et al. |
| 2003/0227531 A1 | 12/2003 | Hosoi et al. |
| 2005/0124755 A1 | 6/2005 | Mitchell |
| 2005/0217815 A1 | 10/2005 | Stoffel et al. |
| 2006/0051528 A1 | 3/2006 | Ogino |
| 2006/0060317 A1 | 3/2006 | Roding et al. |
| 2006/0185808 A1 | 8/2006 | Nguyen |
| 2006/0254738 A1 | 11/2006 | Anderson |
| 2007/0087134 A1 | 4/2007 | Tyan et al. |
| 2007/0087136 A1 | 4/2007 | Stoffel et al. |
| 2007/0087138 A1 | 4/2007 | Koenig et al. |
| 2007/0113995 A1 | 5/2007 | Park |
| 2007/0113998 A1 | 5/2007 | Park |
| 2007/0125267 A1 | 6/2007 | Song et al. |
| 2007/0165977 A1 | 7/2007 | Cole et al. |
| 2008/0081203 A1 | 4/2008 | Knight et al. |
| 2008/0098931 A1 | 5/2008 | Skaggs et al. |
| 2008/0173420 A1 | 7/2008 | Song et al. |
| 2009/0035478 A1 | 2/2009 | Zhou et al. |
| 2009/0165977 A1 | 7/2009 | Huang et al. |
| 2009/0274855 A1* | 11/2009 | Koenig et al. ............. 428/32.21 |
| 2009/0295892 A1 | 12/2009 | Akiyama |
| 2009/0297738 A1* | 12/2009 | Song et al. ............. 428/32.3 |
| 2009/0320708 A1 | 12/2009 | Jackson et al. |
| 2010/0129553 A1 | 5/2010 | Jackson et al. |
| 2011/0151148 A1 | 6/2011 | Koenig et al. |
| 2011/0151149 A1 | 6/2011 | Koenig |
| 2011/0205287 A1 | 8/2011 | Zhou et al. |
| 2011/0240241 A1 | 10/2011 | Koenig et al. |
| 2011/0240242 A1 | 10/2011 | Koenig et al. |
| 2011/0274856 A1 | 11/2011 | Koenig et al. |
| 2012/0019587 A1 | 1/2012 | Koenig |
| 2012/0121872 A1 | 5/2012 | Koenig |

FOREIGN PATENT DOCUMENTS

| | | |
|---|---|---|
| EP | 0666368 B1 | 8/1995 |
| EP | 0747235 | 12/1996 |
| EP | 0999937 B1 | 5/2000 |
| EP | 1036666 | 9/2000 |
| EP | 1079356 | 2/2001 |
| EP | 1122085 | 8/2001 |
| EP | 1355004 | 10/2003 |
| EP | 1566281 | 8/2005 |
| EP | 1571149 | 9/2005 |
| EP | 1582370 B1 | 10/2005 |
| EP | 1712677 | 10/2006 |
| EP | 1743976 | 1/2007 |
| EP | 1775141 | 4/2007 |
| EP | 1947240 | 7/2008 |
| GB | 786543 | 11/1957 |
| GB | 903416 | 8/1962 |
| GB | 1373788 | 11/1974 |
| GB | 1533434 | 11/1978 |
| GB | 2307487 | 11/1995 |
| JP | 2002274012 | 9/2002 |
| JP | 2004255593 | 6/2004 |
| JP | 2006168017 | 6/2006 |
| WO | 9609345 | 3/1996 |
| WO | 9906219 | 2/1999 |
| WO | 9916973 | 4/1999 |
| WO | 03044275 | 5/2003 |
| WO | 2005115763 | 12/2005 |
| WO | 2006049545 | 5/2006 |
| WO | 2006110751 | 10/2006 |
| WO | 2007053681 | 5/2007 |
| WO | 2007141271 | 12/2007 |
| WO | 2008055858 | 5/2008 |
| WO | 2009110910 | 9/2009 |
| WO | 2009124075 | 10/2009 |
| WO | 2009146416 | 12/2009 |

OTHER PUBLICATIONS

Handbook of Pulp & Paper Terminology, Gary A. Smook—pp. 289-292, Aug. 1996.
Quantitative Determination of Alkyl Ketene dimer AKD retention in Paper made on a Pilot Paper Machine, p. 253-260, Nov. 2, 2002.
Automataic Color recognition System for Stockigt Sizing Test II, Journal of Korea TAPPI, 371, 73-81, 2005.
C. E. Farley; R. B. Wasser. The Sizing of Paper. TAPPI Press, 1989, 51-62.

(56) References Cited

OTHER PUBLICATIONS

Paper and board—Determination of sizing—Stoeckigt method, JIS P 8122: 2004, rev. Mar. 20, 2004, published by Japanese Standards Association.

Use of T530 HST on calcium carbonate-containing papers, Stever R. Boone, 1996, Tappi Journal, pp. 122-124.

Tracing Tecnique in Geohydrology by Werner Kass and Horst Behrens, published by Taylor and Francis, 1998, pp. 48-55.

Sythetic Detergents in the Soap Industry Lime Soap Dispersion Test, H.C. Borghetty et al., J. Am. Oil, Chem. Soc., 27:88-90, 1950.

Lipids in Cereal Staraches—A Review; William R. Morrison, Jounal of Cereal Science 8 1988, pp. 1-15.

High Solids Modified Calcium Carbonates A Concept for Inkjet Papers, Varney and Kukkamo, May 2010.

BeMiller et al., Starch, Ullmanns Encyclopedia of Industrial Chemistry, vol. 34, pp. 113-117, online John Wiley and Sons, Inc. 2011 retrieved on May 16, 2012, Retrieved from Internet, http-onlinelibrary.wiley.com/doi, 10.1002-14356007.a25_001.pub4-full.

Chemistry and Application of Rosin Size, E. Strazdins, pp. 1-31—1989.

Pigment Coating Techniques, Chapter 24, p. 415-417, Jukka Linnonmaa and Michael Trefz—2000.

* cited by examiner

PRINTABLE SUBSTRATES WITH IMPROVED DRY TIME AND ACCEPTABLE PRINT DENSITY BY USING MONOVALENT SALTS

FIELD OF THE INVENTION

The present invention broadly relates to printable substrates comprising paper substrates having an HST value of from about 50 to about 250 seconds, and having a metal salt drying agent comprising at least about 20% by weight of one or more monovalent metal drying salts present on one or both surfaces of the paper substrate to improve dry time but with an acceptable print density. The present invention further broadly relates a method for treating an internally sized paper substrate with a composition comprising the metal salt drying agent.

BACKGROUND

In conventional calendered papermaking for providing papers used in printing, a fibrous web may prepared from an aqueous solids mixture which may comprise wood pulp and/or synthetic fibers along with various additives such as sizing agents, binders, fillers, pigments, etc. Sizing agents are used primarily to prevent excess penetration, wicking, spreading, resistance to blotting etc., of water or ink, and especially internal absorption of the water or ink by the resulting paper substrate. Such sizing agents may include "internal sizing" agents in which the sizing agent (e.g., an alkyl ketene dimer, an alkenyl succinic anhydride, etc.) is included, added, etc., during the papermaking process before a fibrous paper substrate is formed, as well as "surface sizing" agents (e.g., starch, styrene maleic anhydride copolymers, styrene acrylates, etc.) in which the sizing agent is applied on, added to, etc., the surface of formed fibrous paper substrate. The sized paper substrate may exhibit improved properties in terms of, for example, print density, because more of the dye or pigment present in the ink remains on the surface of the paper substrate, rather than being absorbed internally by the paper substrate.

In recent years, the use of ink-jet printing methods has been increasing at a rapid rate. Ink jet printing is a method for forming ink images on a paper substrate from deposited droplets of ink comprising dyes or pigments. This printing method enables high-speed and full-color printing to be achieved. In ink jet printing, the fine droplets of ink are sprayed or jetted from printing nozzles at a high speed so as to direct the ink droplets toward, and deposit these droplets on, the paper substrate to provide printed images on the paper substrate.

The ink used in ink jet printing may contain a large quantity of solvent. In the case of inks comprising pigments, the ink may also be in the form of a pigment emulsion. The presence of large quantities of solvent in the ink, or the use of pigment emulsions in the ink, may increase the dry time for the ink droplets deposited on the surface of the paper substrate, and may thus lead to, for example, smearing of the deposited ink droplets. Ink dry time may particularly increase when the ink droplets are deposited onto the surface of a paper substrate which has been treated with an internal and/or surface sizing agent.

SUMMARY

According to a first broad aspect of the present invention, there is provided an article comprising a printable substrate, which comprises:

a paper substrate having a first surface and a second surface;

an internal paper sizing agent present in an amount sufficient to impart to the paper substrate an HST value of from about 50 to about 250 seconds; and a metal salt drying agent comprising at least about 20% by weight of one or more monovalent metal salts, wherein the metal salt drying agent is present on at least one of the first and second surfaces in an amount sufficient to provide a percent ink transferred ("IT %") value equal to or less than about 65% and to provide a black print density value of at least about 1.45.

According to a second broad aspect of the present invention, there is provided a method comprising the following steps:

(a) providing a paper substrate having a first surface and a second surface, wherein an internal paper sizing agent is present in an amount sufficient to impart to the paper substrate an HST value of from about 50 to about 250 seconds; and (b) treating the paper substrate with a coating composition comprising a metal salt drying agent comprising at least about 20% by weight of one or more monovalent metal salts, wherein the metal salt drying agent is present on at least one of the first and second surfaces in an amount sufficient to provide a percent ink transferred ("IT %") value equal to or less than about 65% and to provide a black print density value of at least about 1.45.

BRIEF DESCRIPTION OF THE DRAWINGS

The invention will be described in conjunction with the accompanying drawings, in which.

DETAILED DESCRIPTION

Figure 1:
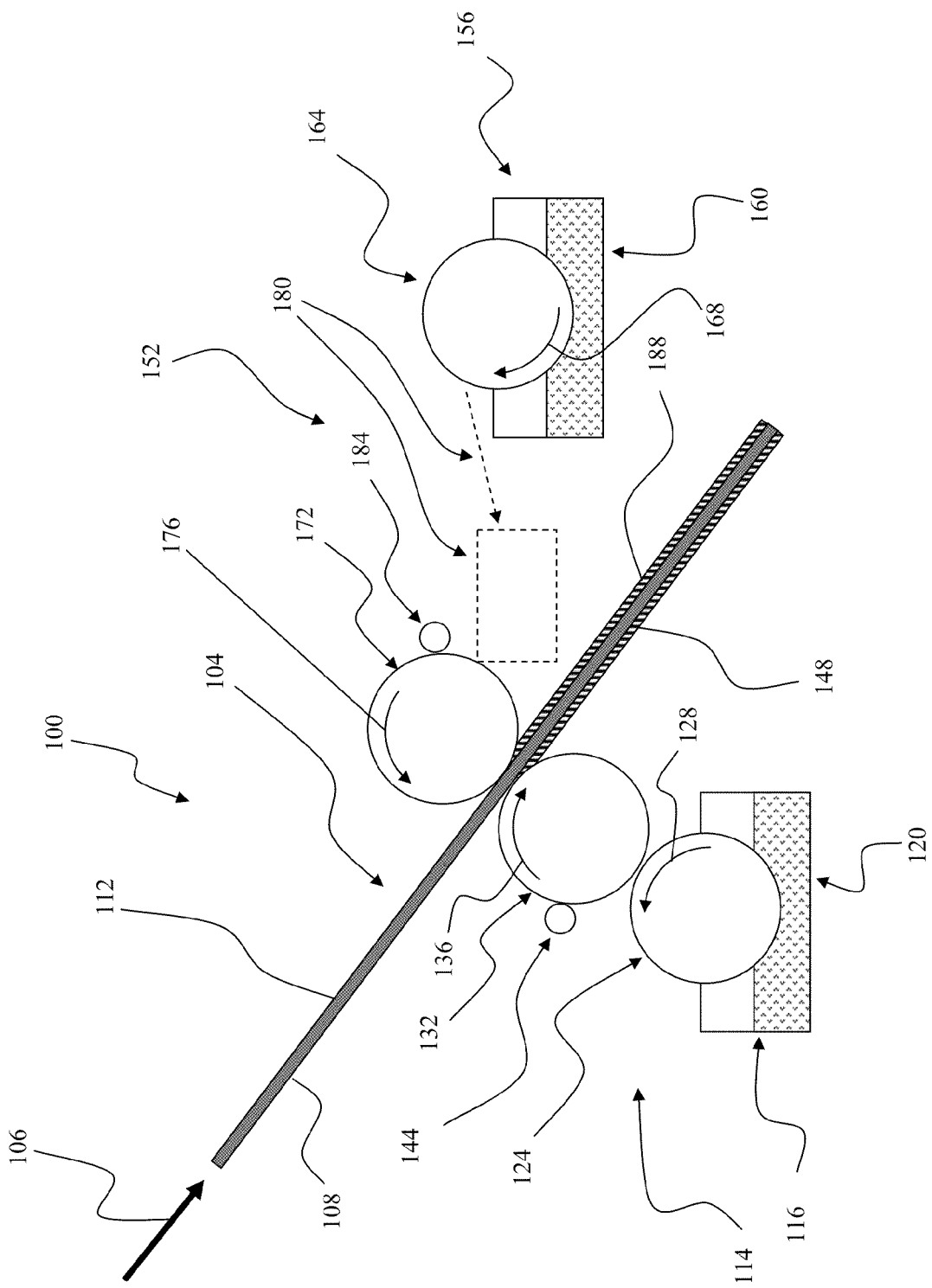
FIG. 1 a schematic diagram illustrating an embodiment of a method for treating one or both surfaces of a paper substrate with a coating composition comprising the metal salt drying agent using a metering rod size press.

It is advantageous to define several terms before describing the invention. It should be appreciated that the following definitions are used throughout this application.

Definitions

Where the definition of terms departs from the commonly used meaning of the term, applicant intends to utilize the definitions provided below, unless specifically indicated.

For the purposes of the present invention, directional terms such as "top", "bottom", "side," "front," "frontal," "forward," "rear," "rearward," "back," "trailing," "above", "below", "left", "right", "horizontal", "vertical", "upward", "downward", etc. are merely used for convenience in describing the various embodiments of the present invention. The embodiments of the present invention may be oriented in various ways.

For the purposes of the present invention, the term "printable substrate" refers to any paper substrate which may be printed on with an ink jet printing process. Printable substrates may include webs, sheets, strips, etc., may be in the form of a continuous roll, a discrete sheet, etc.

For the purposes of the present invention, the term "paper substrate" refers to a fibrous web that may be formed, created, produced, etc., from a mixture, furnish, etc., comprising paper fibers, internal paper sizing agents, etc., plus any other optional papermaking additives such as, for example, fillers, wet-strength agents, optical brightening agents (or fluorescent whitening agent), etc. The paper substrate may be in the form of a continuous roll, a discrete sheet, etc.

For the purposes of the present invention, the term "paper filler" refers commonly to mineral products (e.g., calcium carbonate, kaolin clay, etc.) which may be used in paper making to reduce materials cost per unit mass of the paper, increase opacity, increase smoothness, etc. These mineral products may be finely divided, for example, the size range of from about 0.5 to about 5 microns.

For the purposes of the present invention, the term "uncoated paper substrate" refers to a paper substrate which has 0 or substantially 0 paper surface loading of a coating composition present on one or both sides or surfaces of the paper substrate.

For the purposes of the present invention, the term "single-side coated paper substrate" refers to a paper substrate which has a surface loading of a coating composition present on one, but not both, sides or surfaces of the paper substrate.

For the purposes of the present invention, the term "double-side coated paper substrate" refers to a paper substrate which has a surface loading of a coating composition present on both sides or surfaces of the paper substrate.

For the purposes of the present invention, the term "calendered paper" refers to a paper substrate which has been subjected to calendering to, for example, smooth out the paper for enabling printing and writing on the paper, and to increase the gloss on the paper surface. For example, calendering may involve a process of using pressure for embossing a smooth surface on the still rough paper surface. Calendering of paper may be carried out on a calendar which may comprise a series of rolls at the end of a papermaking machine (on-line), or separate from the papermaking machine (off-line).

For the purposes of the present invention, the term "coating composition" refers to those compositions, which comprise, at minimum, a metal salt drying agent. These coating compositions may also include other optional additives, such as, for example, a calcium carbonate pigment component, plastic pigments, substrate pigment binders, surface paper sizing agents, cationic dye fixing agents, optical brightening agents, fluorescent whitening agents, solvents, diluents, anti-scratch and mar resistance agents, etc. The coating composition may be formulated as an aqueous solution, an aqueous slurry, a colloidal suspension, a liquid mixture, a thixotropic mixture, etc.

For the purposes of the present invention, the term "solids basis" refers to the weight percentage of each of the respective solid materials (e.g., a metal salt drying agent; calcium carbonate pigment component; a cationic dye fixing agent; plastic pigment, surface paper sizing agent, optical brightening agent, etc.) present in the coating composition, coating, etc., in the absence of any liquids (e.g., water). Unless otherwise specified, all percentages given herein for the solid materials are on a solids basis.

For the purposes of the present invention, the term "solids content" refers to the percentage of non-volatile, non-liquid components (by weight) that are present in the composition, etc.

For the purposes of the present invention, the term "substrate pigment" refers to a material (e.g., a finely divided particulate matter) which may be used or may be intended to be used to affect optical properties of a printable substrate.

For the purposes of the present invention, the term "calcium carbonate" refers various calcium carbonates which may be used as substrate pigments, such as precipitated calcium carbonate (PCC), ground calcium carbonate (GCC), modified PCC and/or GCC, etc.

For the purposes of the present invention, the term "precipitated calcium carbonate (PCC)" refers to a calcium carbonate which may be manufactured by a precipitation reaction and which may used as a substrate pigment. PCC may comprise almost entirely of the calcite crystal form of $CaCO_3$. The calcite crystal may have several different macroscopic shapes depending on the conditions of production. Precipitated calcium carbonates may be prepared by the carbonation, with carbon dioxide ($CO_2$) gas, of an aqueous slurry of calcium hydroxide ("milk of lime"). The starting material for obtaining PCC may comprise limestone, but may also be calcined (i.e., heated to drive off $CO_2$), thus producing burnt lime, CaO. Water may added to "slake" the lime, with the resulting "milk of lime," a suspension of $Ca(OH)_2$, being then exposed to bubbles of $CO_2$ gas. Cool temperatures during addition of the $CO_2$ tend to produce rhombohedral (blocky) PCC particles. Warmer temperatures during addition of the $CO_2$ tend to produce scalenohedral (rosette-shaped) PCC particles. In either case, the end the reaction occurs at an optimum pH where the milk of lime has been effectively converted to $CaCO_3$, and before the concentration of $CO_2$ becomes high enough to acidify the suspension and cause some of it to redissolve. In cases where the PCC is not continuously agitated or stored for many days, it may be necessary to add more than a trace of such anionic dispersants as polyphosphates. Wet PCC may have a weak cationic colloidal charge. By contrast, dried PCC may be similar to most ground $CaCO_3$ products in having a negative charge, depending on whether dispersants have been used. The calcium carbonate may be precipitated from an aqueous solution in three different crystal forms: the vaterite form which is thermodynamically unstable, the calcite form which is the most stable and the most abundant in nature, and the aragonite form which is metastable under normal ambient conditions of temperature and pressure, but which may convert to calcite at elevated temperatures. The aragonite form has an orthorhombic shape that crystallizes as long, thin needles that may be either aggregated or unaggregated. The calcite form may exist in several different shapes of which the most commonly found are the rhombohedral shape having crystals that may be either aggregated or unaggregated and the scalenohedral shape having crystals that are generally unaggregated.

For the purposes of the present invention, the term "low particulate surface area" with reference to the calcium carbonate pigment refers to a BET specific surface area of about 30 meters square per gram (hereinafter "msg") or less, for example, from about 5 to about 30 msg, more typically from about 8 to about 16 msg.

For the purposes of the present invention, the term "high particulate surface area" with reference to the calcium carbonate pigment refers to a BET specific surface area of greater than about 30 meters square per gram (hereinafter "msg"), for example, from about 30 to about 200 msg, more typically from about 50 to about 120 msg.

For the purposes of the present invention, the term "substrate pigment binder" refers to a binder agent for paper substrates which may be used to improve the substrate pigment binding strength of the coating composition, coating, etc. Substrate pigment binders may be hydrophilic. Suitable substrate pigment binders may include synthetic or naturally occurring polymers (or a combination of different polymers), for example, a polyvinyl alcohol (PVOH), starch binders, proteinaceous adhesives such as, for example, casein or soy proteins, etc.; polymer latexes such as styrene butadiene rubber latexes, acrylic polymer latexes, polyvinyl acetate latexes, styrene acrylic copolymer latexes, etc., or a combination thereof. The substrate pigment binder may also be substantially free of starch binders and/or latexes as binders to improve the dry time of the coated printable substrate and to improve the processability of the printable substrate during the coating process.

For the purposes of the present invention, the term "substantially free" refers to a coating composition, coating, etc., having less than about 0.1% of a particular component by weight of the coating composition, coating, etc.

For the purposes of the present invention, the term "starch binder" refers to a binder agent for substrate pigments and/or paper substrates which comprises starch, a starch derivative, etc., or a combination thereof. Suitable starch binders may be derived from a natural starch, e.g., natural starch obtained from a known plant source, for example, wheat, maize, potato, tapioca, etc. The starch binder may be modified (i.e., a modified starch) by one or more chemical treatments known in the paper starch binder art, for example, by oxidation to convert some of $-CH_2OH$ groups to $-COOH$ groups, etc. In some cases the starch binder may have a small proportion of acetyl groups. Alternatively, the starch binder may be chemically treated to render it cationic (i.e., a cationic starch) or amphoteric (i.e., an amphoteric starch), i.e., with both cationic and anionic charges. The starch binder may also be a starch converted to a starch ether, or a hydroxyalkylated starch by replacing some $-OH$ groups with, for example, $-OCH_2CH_2OH$ groups, $-OCH2CH_3$ groups, $-OCH_2CH_2CH_2OH$ groups, etc. A further class of chemically treated starch binders which may be used are known as the starch phosphates. Alternatively, raw starch may be hydrolyzed by means of a dilute acid, an enzyme, etc., to produce a starch binder in the form of a gum of the dextrin type.

For the purposes of the present invention, the term "metal salt drying agent" refers to those metal salts which may improve the dry time of inks deposited or printed on printable substrates by ink jet printing processes. These metal salt drying agents comprise at least 20% by weight (e.g., from about 20 to about 90% by weight), for example, at least about 50% by weight (e.g., from about 50 to about 90% by weight, such as from about 60 to about 80% by weight) of one or more monovalent metal drying salts (i.e., metal cation has a positive charge of one), and optionally one or more multivalent metal drying salts (i.e., metal cation has a positive charge of two or more) which are water soluble. The counter ions for these metal salts may include, for example, chloride, bromide, acetate, bicarbonate, sulfate, sulfite, nitrate, hydroxide, silicate, chlorohydrate, etc. Suitable monovalent metal salts may include one or more of sodium chloride, sodium acetate, sodium carbonate, sodium bicarbonate, sodium hydroxide, sodium silicates, sodium sulfate, sodium sulfite, sodium nitrate, sodium bromide, potassium chloride, potassium acetate, potassium carbonate, potassium bicarbonate, potassium hydroxide, potassium silicates, potassium sulfate, potassium sulfite, potassium nitrate, potassium bromide, lithium chloride, lithium acetate, lithium carbonate, lithium bicarbonate, lithium hydroxide, lithium silicates, lithium sulfate, lithium sulfite, lithium nitrate, lithium bromide, etc. Suitable optional multivalent metal salts (e.g., divalent salts, trivalent salts, etc.) may include one or more of calcium chloride, calcium acetate, calcium hydroxide, calcium nitrate, calcium sulfate, calcium sulfite, magnesium chloride, magnesium acetate, magnesium nitrate, magnesium sulfate, magnesium sulfite, aluminum chloride, aluminum nitrate, aluminum sulfate, aluminum chlorohydrate, sodium aluminum sulfate, vanadium chloride, etc.

For the purposes of the present invention, the term "cationic dye fixing agent" refers to those cationic compounds (e.g., nitrogen-containing compounds) or mixtures of such compounds which may aid in fixing, trapping, etc., inks printed by inkjet printing processes, and which may provide other properties, including water fastness. These cationic dye fixing agents may include compounds, oligomers and polymers which contain one or more quaternary ammonium functional groups, and may include cationic water-soluble polymers that are capable of forming a complex with anionic dyes. Such functional groups may vary widely and may include substituted and unsubstituted amines, imines, amides, urethanes, quaternary ammonium groups, dicyandiamides, guanadines, biguanides, etc. Illustrative of such compounds are polyamines, polyethyleneimines, polymers or copolymers of diallyldimethyl ammonium chloride (DADMAC), copolymers of vinyl pyrrolidone (VP) with quaternized diethylaminoethylmethacrylate (DEAMEMA), polyamides, polyhexamethylene biguanide (PHMB), cationic polyurethane latexes, cationic polyvinyl alcohols, polyalkylamines dicyandiamid copolymers, amine glycidyl addition polymers, poly[oxyethylene(dimethyliminio)ethylene(dimethyliminio)ethylene] dichlorides, etc., or combinations thereof These cationic dye fixing agents may include low to medium molecular weight cationic polymers and oligomers having a molecular equal to or less than 100,000, for example, equal to or less than about 50,000, e.g., from about 10,000 to about 50,000. Illustrative of such materials are polyalkylamine dicyandiamide copolymers, poly[oxyethylene(dimethyliminio ethylene(dimethyliminioethylene] dichlorides and polyamines having molecular weights within the desired range. Cationic dye fixing agents suitable herein may include low molecular weight cationic polymers such as polyalkylamine dicyandiamid copolymer, poly[oxyethylene(dimethyliminio)ethylene(dimethyliminio)ethylene] dichloride, for example, low molecular weight polyalkylamine dicyandiamid copolymers. See U.S. Pat. No. 6,764,726 (Yang et al.), issued Jul. 20, 2004, the entire disclosure and contents of which is hereby incorporated by reference.

For the purposes of the present invention, the term "brightness" refers to the diffuse reflectivity of paper, for example, at a mean wavelength of light of 457 nm. As used herein, brightness of the paper substrate may be measured, for example, in terms of GE Brightness or ISO Brightness.

For the purposes of the present invention, the term "opacity" refers to the ability of a paper to hide things such as print images on subsequent sheets or printed on the back, e.g., to minimize, prevent, etc., show-through, etc. As used herein, opacity of the paper substrate may be measured by, for example, in terms of TAPPI opacity and show-through. TAPPI opacity may be measured by T425 om-91.

For the purposes of the present invention, the term "paper smoothness" refers to the extent to which the paper surface deviates from a planar or substantially planar surface, as affected by the depth of the paper, paper width, numbers of departure from that planar surface, etc. As used herein, the paper smoothness of a paper substrate may be measured by, for example, in terms of Parker Print Smoothness. Parker Print Smoothness may be measured by TAPPI test method T 555 om-99.

For the purposes of the present invention, the term "print quality" refers to those factors, features, characteristics, etc., that may influence, affect, control, etc., the appearance, look, form, etc., of a printed image on the printable substrate. Print quality of a paper substrate may be measured in terms of, for example, one or more of: (1) print density; (2) print contrast; (3) dry times; (4) edge acuity; (5) color gamut; (6) color richness; (7) print gloss; (8) print mottle; and (9) color-to-color bleed. For the purposes of the present invention, print quality of the paper substrate is primarily determined herein by measuring the print density, dry time, and edge acuity of the paper substrate.

For the purposes of the present invention, the term "print density" refers to the optical density ("OD") measured by using a reflectance densitometer (X-Rite, Macbeth. Etc.) which measures the light absorbing property of an image printed on a paper sheet. For example, the higher the print density, the darker the print image may appear. Higher print densities also provide a higher contrast, a sharper image for viewing, etc. Print density is measured herein in terms of the black print density (i.e., the print density of images which are black in color). The method for measuring black print density involves printing a solid block of black color on a paper sheet, and then measuring the optical density. The printer used to print the solid block of black color on the paper sheet is an HP Deskjet 6122, manufactured by Hewlett-Packard, (or its equivalent) which uses a #45 (HP product number 51645A) black ink jet cartridge (or its equivalent). The default setting of Plain Paper type and Fast Normal print quality print mode is used in printing the solid block of black color on the paper sheet. An X-Rite model 528 spectrodensitometer with a 6 mm aperture may be used to measure the optical density of the solid block of black color printed on the paper sheet to provide black print density values. The black print density measurement settings used are Visual color, status T, and absolute density mode. In general, acceptable black print density ("$OD_O$") values for black pigment are at least about 1.45 when using a standard (plain paper, normal) print mode for the HP desktop ink jet printer and when using the most common black pigment ink (equivalent to the #45 ink jet cartridge). Some embodiments of the paper substrates of the present invention may exhibit black print density ($OD_O$) values of at least about 1.50, for example, at least about 1.60. See also commonly assigned U.S. Pat. Appln. No. 2007/0087134 (Koenig et al.), published Apr. 19, 2007, the entire disclosure and contents of which is herein incorporated by reference, which describes how to carry out this black print density test.

For the purposes of the present invention, the term "print contrast" refers to the difference in print density between printed and unprinted areas.

For the purposes of the present invention, the term "dry time" refers to the time it takes for deposited ink to dry on the surface of a printable substrate. If the deposited ink does not dry quickly enough, this deposited ink may transfer to other printable substrate sheets, which is undesirable. The percentage of ink transferred ("IT %") is recorded as a measure of the dry time. The higher the amount of the percentage of ink transferred, the slower (worse) the dry time. Conversely, the lower the amount of the percentage of ink transferred, faster (better) the dry time. In general, embodiments of the paper substrates of the present invention provide a percent ink transferred ("IT %") value equal to or less than about 65%. In some embodiments of the paper substrates of the present invention, the IT % value may be equal to or less than about 50%, for example, equal to or less than about 40% (e.g., equal to or less than about 30%.

For the purposes of the present invention, the term "ink transfer" refers to a test for determining the dry time of a printable substrate, for example, printable paper sheets. "Ink transfer" is defined herein as the amount of optical density transferred after rolling with a roller, and is expressed as a percentage of the optical density transferred to the unprinted portion of the printable substrate (e.g., paper sheet) after rolling with a roller. The method involves printing solid colored blocks on paper having a basis weight of 20 lbs/1300 ft.$^2$, waiting for a fixed amount of time, 5 seconds after printing, and then folding in half so that the printed portion contacts an unprinted portion of the paper sheet, and rolling with a 4.5 lb hand roller as for example roller item number HR-100 from Chem Instruments, Inc., Mentor, Ohio, USA. The optical density is read on the transferred ($OD_T$), the non-transferred ($OD_O$) portions of the block, and an un-imaged area ($OD_B$) by a reflectance densitometer (X-Rite, Macbeth. Etc.). The percent transferred ("IT %") is defined as IT %=[($OD_T$−$OD_B$)/($OD_O$−$OD_B$)]×100. See also commonly assigned U.S. Pat. Appln. No. 2007/0087134 (Koenig et al.), published Apr. 19, 2007, the entire disclosure and contents of which is herein incorporated by reference, which describes how to carry out the ink transfer test.

For the purposes of the present invention, the term "edge acuity (EA)" refers to the degree of sharpness (or raggedness) of the edge of a printed image (e.g., a printed line). Edge acuity (EA) may be measured by an instrument such as the QEA Personal Image Analysis System (Quality Engineering Associates, Burlington, Mass.), the QEA ScannerIAS, or the ImageXpert KDY camera-based system. All of these instruments collect a magnified digital image of the sample and calculate an EA value by image analysis. The EA value (also known as "edge raggedness") is defined in ISO method 13660. This method involves printing a solid line 1.27 mm or more in length, and sampling at a resolution of at least 600 dpi. The instrument calculates the location of the edge based on the darkness of each pixel near the line edges. The edge threshold may be defined as the point of 60% transition from the substrate reflectance factor (light area, $R_{max}$) to the image reflectance factor (dark area, $R_{max}$) using the equation $R_{60}=R_{max}-60\%(R_{max}-R_{min})$. The edge raggedness may then be defined as the standard deviation of the residuals from a line fitted to the edge threshold of the line, calculated perpendicular to the fitted line. For embodiments of paper substrates of the present invention, the EA value may be less than about 15, for example, less than about 12, such as less than about 10 (e.g., less than about 8). See also commonly assigned U.S. Pat. Appln. No. 2007/0087134 (Koenig et al.), published Apr. 19, 2007, the entire disclosure and contents of which is herein incorporated by reference, which describes how to measure edge acuity (EA) values.

For the purposes of the present invention, the term "color gamut" refers to the total collection of possible colors in any color reproduction system and may be defined by a complete subset colors. A higher color gamut value indicates a more vivid color print quality. Color gamut may be obtained by measuring the CIE L*, a*, b* of a series of color blocks, including white (unprinted area), cyan, magenta, yellow, red, green, blue and black, and from these measured values, calculating a suitable color gamut. The CIE L* represents the whiteness. The value of L* may range from zero (representing black) to 100 (representing white or a perfectly reflecting diffuser). The value of a* represents the degree of green/red. A positive a* is red, while a negative a* is green. A positive b* is yellow, while a negative b* is blue. The CIE L*, a* and b* values may be measured by X-Rite 528 using a D65 light source and a 10-degree viewing angle.

For the purposes of the present invention, the term "color richness" refers to a more vivid or vibrant color print with high print density and high color gamut values.

For the purposes of the present invention, the term "gloss" refers to the ability of paper to reflect some portion of the incident light at the mirror angle. Gloss may be based on a measurement of the quantity of light specularly reflected from the surface of a paper specimen at a set angle, for example, at 75 degrees, such as in the case of 75 degree gloss (and as measured by TAPPI test method T 480 om-92).

For the purposes of the present invention, the term "print gloss" refers to a gloss measurement made on a printed paper substrate.

For the purposes of the present invention, the term "print mottle" refers to non-uniformity in the print image which may be due to unevenness in ink lay, non-uniform ink absorption, etc., across the printable substrate surface. Print mottle may be measured using a scanner based mottle tester such as the C3PATX03 Formation and Mottle Test with an Agfa Model DUOSCAN scanner. The printable substrate (e.g., paper sheet) sample to be tested is first printed on a test ink jet printer. The test pattern must include a block of solid black (100%) image. The color block is a square of about 20-50 mm by 20-50 mm. After 20 minutes of waiting time, or when the printed image is fully dried, the printed sample is positioned on the scanner with printed face down. The scanner is set at a resolution of 500 ppi (pixel per inch). A Verity software (Verity IA LLC, 2114 Sunrise Drive, Appleton, Wis. 54914) may be used to analyze the test data from the scanner. An appropriate dimension for testing based on the color block dimension is set. Two mottle indices may be measured: Micro Mottle Index and Macro Mottle Index. The Micro Mottle Index measures density variations within an area of 0.1 in$^2$; while the macro mottle index measures the density variations of the averaged density values of each square of 0.1 in$^2$. The lower the mottle index value, the better the print quality.

For the purposes of the present invention, the term "color-to-color bleed" refers to the spreading of one color ink into another color ink on paper which may reduce the resolution of the colored text and lines on a colored background. For example blue and black bars may be printed over a yellow color background. Green and black bars may be printed over magenta color background, and red and black bars may be printed over cyan color background. The smallest distance in microns between two color bars without bridging (or color intruding more than half way to the neighboring color bar) is recorded as the color-to-color bleed index. In other words, the smaller the value of color-to-color bleed, the better the print quality. Distances which may be tested include 50 microns, 100 microns, 150 microns, 300 microns, etc. In some embodiments of the present invention, the tested distance may reach 150 microns or less before bridging (bleed) occurs, which may be considered a "good" color-to-color bleed property.

For the purposes of the present invention, the term "digital printing" refers to reproducing, forming, creating, providing, etc., digital images on a printable substrate, for example, paper, Digital printing may include laser printing, ink jet printing, etc.

For the purposes of the present invention, the term "laser printing" refers to a digital printing technology, method, device, etc., that may use a laser beam to create, form produce, etc., a latent image on, for example, photoconductor drum. The light of laser beam may later create charge on the drum which may then pick up toner which carries an opposite charge. This toner may then be transferred to the paper and the resulting print image created, formed, produced, etc., fused to the printable substrate through, for example, a fuser.

For the purposes of the present invention, the term "electrophotographic recording process" refers to a process which records images on a printable substrate, such as paper, by xerography or electrophotography. In an electrophotographic process, the image is often formed on of the c by toner particles which are deposited one surface or side of the printable substrate, and are then thermally fixed and/or fused to that one surface or side of the printable substrate, for example, by heating. In electrophotographic recording, the printable substrate may have two relatively smooth or flat sides or surfaces, or may have one side or surface which is textured, uneven or nonsmooth/nonflat, while the other side or surface is relatively smooth or flat.

For the purposes of the present invention, the term "ink jet printing" refers to a digital printing technology, method, device, etc., that may form images on a printable substrate, such as paper, by spraying, jetting, etc., tiny droplets of liquid inks onto the printable substrate through the printer nozzles. The size (e.g., smaller size), precise placement, etc., of the ink droplets may be provide higher quality inkjet prints. Ink jet printing may include continuous ink jet printing, drop-on-demand ink jet printing, etc.

For the purposes of the present invention, the term "liquid" refers to a non-gaseous fluid composition, compound, material, etc., which may be readily flowable at the temperature of use (e.g., room temperature) with little or no tendency to disperse and with a relatively high compressibility.

For the purposes of the present invention, the term "viscosity," with reference to coating compositions, refers to Brookfield viscosity. The Brookfield viscosity may be measured by a Brookfield viscometer at 150° F., using a #5 spindle at 100 rpm.

For the purpose of the present invention, the term "printer" refers to any device which prints an image on a printable substrate, such as a paper sheet, including laser printers, inkjet printers, electrophotographic recording devices (e.g., copiers), scanners, fax machines, etc.

For the purpose of the present invention, the term "printer pigment" may refer to either ink (as used by, for example, an inkjet printer, etc.) and toner (as used by, for example, a laser printer, electrographic recording device, etc.).

For the purpose of the present invention, the term "ink" refers printer pigment as used by ink jet printers. The term ink may include dye-based inks and/or pigment-based inks. Dye-based inks comprise a dye which may be an organic molecule which is soluble in the ink medium. Dye-based inks may be classified by their usage, such as acid dyes, basic dyes, or direct dyes, or by their chemical structure, such as azo dyes, which are based on the based on an —N=N— azo structure; diazonium dyes, based on diazonium salts; quinone-imine dyes, which are derivates of quinine, etc. Pigment-based dyes comprise a pigment, which is a solid colored particle suspended in the ink medium. The particle may comprise a colored mineral, a precipitated dye, a precipitated dye which is attached to a carrier particle, etc. Inks are often dispensed, deposited, sprayed, etc., on a printable medium in the form of droplets which then dry on the printable medium to form the print image(s).

For the purpose of the present invention, the term "toner" refers printer pigment as used by laser printers. Toner is often dispensed, deposited, etc., on the printable medium in the form of particles, with the particles then being fused on the printable medium to form the image.

For the purposes of the present invention, the term "coater" refers to a device, equipment, machine, etc., which may be used to treat, apply, coat, etc., coating compositions to one or more sides or surfaces of a paper substrate, for example, just after the paper substrate has been dried for the first time. Coaters may include air-knife coaters, rod coaters, blade coaters, size presses, etc. See G. A. Smook, Handbook for Pulp and Paper Technologists ($2^{nd}$ Edition, 1992), pages 289-92, the entire contents and disclosure of which is herein incorporated by reference, for a general description of coaters that may be useful herein. Size presses may include a puddle size press, a metering size press, etc. See G. A. Smook, Handbook for Pulp and Paper Technologists ($2^{nd}$ Edition, 1992), pages 283-85, the entire contents and disclosure of which is herein incorporated by reference, for a general description of size presses that may be useful herein.

For the purposes of the present invention, the term "flooded nip size press" refers to a size press having a flooded nip (pond), also referred to as a "puddle size press." Flooded nip size presses may include vertical size presses, horizontal size presses, etc.

For the purposes of the present invention, the term "metering size press" refers to a size press that includes a component for spreading, metering, etc., deposited, applied, etc., coating composition or coating on a paper substrate side or surface. Metering size presses may include a rod metering size press, a gated roll metering size press, a doctor blade metering size press, etc.

For the purposes of the present invention, the term "rod metering size press" refers to metering size press that uses a rod to spread, meter, etc., the coating composition or coating on the paper substrate surface. The rod may be stationary or movable relative to the paper substrate.

For the purposes of the present invention, the term "gated roll metering size press" refers to a metering size press that may use a gated roll, transfer roll, soft applicator roll, etc. The gated roll, transfer roll, soft applicator roll, etc., may be stationery relative to the paper substrate, may rotate relative to the paper substrate, etc.

For the purposes of the present invention, the term "doctor blade metering size press" refers to a metering press which may use a doctor blade to spread, meter, etc., the coating composition or coating on the paper substrate surface.

For the purposes of the present invention, the term "room temperature" refers to the commonly accepted meaning of room temperature, i.e., an ambient temperature of 20° to 25° C.

For the purposes of the present invention, the term "paper substrate surface coverage" refers to amount of a coating present on a given side or surface of the paper substrate being treated. Paper substrate surface coverage may be defined in terms of grams of composition per square meter of paper substrate (hereinafter referred to as "gsm").

For the purposes of the present invention, the term "remains predominantly on the surface(s) of the paper substrate" refers to the coating composition or coating remaining primarily on the surface of the paper substrate, and not being absorbed by or into the interior of the paper substrate.

For the purpose of the present invention, the term "treating" with reference to the coating composition may include depositing, applying, spraying, coating, daubing, spreading, wiping, dabbing, dipping, etc.

For the purpose of the present invention, the term "Hercules Sizing Test" or "HST" refers to a test of resistance to penetration of, for example, an acidic water solution through paper. The HST may be measured using the procedure of TAPPI Standard Method 530 pm-89. See U.S. Pat. No. 6,764,726 (Yang et al.), issued July 20, 2004, the entire disclosure and contents of which is hereby incorporated by reference. The HST value is measured following the conventions described in TAPPI Standard Method number T-530 pm-89, using 1% formic acid ink and 80% reflectance endpoint. The HST value measured reflects the relative level of paper sizing present in and/or on the paper substrate. For example, lower HST values (i.e., HST values below about 50 seconds) reflect a relatively low level of paper sizing present in the paper substrate. Conversely, higher HST values (i.e., HST values above about 250 seconds) reflect a relatively high level of paper sizing present in and/or on the paper substrate. For the purposes of the present invention, an HST value in the range from about 50 to about 250 seconds is considered to be an intermediate HST value reflecting an intermediate level of paper sizing present in and/or on the paper substrate. The HST value measured also reflects both the level of both internal paper sizing, as well as the level of surface paper sizing present. But at the relatively low levels of paper sizing agents normally used in papermaking (e.g., from about 1 to about 2 lbs/ton or from about 0.04 to about 0.08 gsm for paper having a basis weight of 20 lbs/1300 ft.$^2$), the HST value of the paper substrate primarily (if not exclusively) reflects the contribution imparted by the internal paper sizing agents (which generally increase HST values greatly even at low usage levels), rather than surface paper sizing agents (which generally increase HST values minimally at such low usage levels).

For the purposes of the present invention, the term "level of paper sizing" refers to the paper sizing level present in and/or on the paper substrate, and may comprise internal sizing, surface sizing, or both internal sizing and surface sizing.

For the purposes of the present invention, the term "internal sizing" refers to paper sizing present in the paper substrate due to internal paper sizing agents which are included, added, etc., during the papermaking process before a fibrous paper substrate is formed. Internal paper sizing agents generally resist penetration of water or other liquids into the paper substrate by reacting with the paper substrate to make the paper substrate more hydrophobic. Illustrative internal paper sizing agents may include, for example, alkyl ketene dimers, alkenyl succinic anhydrides, etc.

For the purposes of the present invention, the term "surface sizing" refers to paper sizing present in the paper substrate due to surface paper sizing agents which are applied on, added to, etc., the surface of the formed fibrous paper substrate. Surface paper sizing agents generally resist penetration of water or other liquids into the paper substrate by covering the paper substrate with a more hydrophobic film. Illustrative surface paper sizing agents may include, for example, starch, modified starch, styrene maleic anhydride copolymers, styrene acrylates, etc.

Description

Embodiments of the articles of the present invention comprising the printable substrates provide the benefit of improved dry times (in terms of reduced percent ink transfer transferred) while at least maintaining an acceptable print density (measured in terms of black print density values) and edge acuity (EA). The embodiments of these printable substrates comprise a paper substrate having an HST value of from about 50 to about 250 seconds (i.e., an intermediate HST value), and having a metal salt drying agent comprising at least about 20% by weight (e.g., from about 20 to about 90% by weight), for example, at least about 50% by weight (e.g., from about 50 to about 90% by weight, such as from about 60 to about 80% by weight) of one or more monovalent metal drying salts present on one or both surfaces of the paper substrate to improve dry time. In general, the metal salt drying agent comprising the monovalent metal drying salt(s) is present in amounts sufficient to impart to the treated surfaces of these paper substrates dry times, as measured by percent ink transferred (IT %) values, equal to or less than about 65%. In some embodiments of the paper substrates of the present invention, the amount of the metal salt drying agent comprising the monovalent metal drying salt(s) may be sufficient to impart a IT % value equal to or less than about 50%, for example, equal to or less than about 40% (e.g., equal to or less than about 30%).

The presence of these monovalent metal drying salts in the metal salt drying agent on the paper substrate surface destabilizes the pigment emulsion in the ink droplets deposited by an ink jet printer. The resulting destabilization of the pigment emulsion causes precipitation of pigment particles, thus resulting in a faster and improved dry time. For embodiments of the paper substrates of the present invention, coverage of one or both surfaces of the paper surfaces with, for example, from about 0.2 to about 1.2 gsm (e.g., from about 0.5 to about 1 gsm) of such metal salt drying agents may impart to the treated paper substrate surface dry times as specified above in terms of maximum IT % values.

These improved dry times by using monovalent metal drying salts in the metal salt drying agent are achieved with paper substrates having an intermediate internal sizing value (as measured by the Hercules Sizing Test) of from about 50 to about 250 seconds, for example, a Hercules Sizing Test (HST) value of from about 60 to about 200 seconds, such as from about 70 to about 160 seconds. If the HST value of the paper substrate is below about 50 seconds, using amounts of at least about 50% by weight monovalent metal drying salts in the metal salt drying agent may result in a decreased print density (e.g., decreased black print density values) compared to paper substrates which use solely multivalent metal drying salts (e.g., calcium chloride) in the metal salt drying agent. At intermediate HST values (i.e., from about 50 to about 250 seconds), use of the monovalent salts (e.g., sodium salts such as sodium chloride) in the metal salt drying agent in amounts of, for example, at least about 50% by weight of the metal salt drying agent may result in print densities for the paper substrate which, while potentially somewhat lower, are more comparable and acceptable to print densities achieved with paper substrates which use only multivalent metal drying salts as the metal salt drying agent. In general, embodiments of paper substrates of the present invention may achieve print densities (in terms of black print density values) of at least about 1.45 (e.g., at least about 1.50).

In addition, if higher print densities (e.g., black print density values of at least about 1.60) are desired for embodiments of these paper substrates having intermediate HST values, a mixture of monovalent and multivalent metal drying salts may be used as the metal salt drying agent, for example, a mixture of sodium chloride and calcium chloride in a weight ratio of from about 1:4 to about 9:1, for example, a weight ratio of from about 1:1 to about 9:1, such as a weight ratio of from about 3:2 to about 4:1) sodium chloride:calcium chloride (e.g., in a weight ratio of about 3:1 sodium chloride:calcium chloride). This mixture of monovalent and multivalent metal drying salts in the metal salt drying agent (wherein the amount of monovalent salt(s) is equal to or greater than the amount of multivalent salt(s)) may provide as high or almost as high a print density (e.g., black print density values of at least about 1.60) as those paper substrates having intermediate HST values that use multivalent salts alone as the metal salt drying agent.

Embodiments of the paper substrate of the present invention comprise an internal paper sizing agent in an amount sufficient to impart to the paper substrate an HST value of from about 50 to about 250 seconds, for example, an HST value of from about 60 to about 200 seconds, such as from about 70 to about 160 seconds. In embodiments of methods of the present invention, one or both surfaces of these internally sized paper substrates may be treated with a coating composition containing the metal salt drying agent comprising the monovalent drying metal salt(s) (and optionally multivalent drying salt(s)) in amounts sufficient to provide paper substrates with dry times as specified above in terms of percent ink transferred ("IT %") values (e.g., equal to or less than about 65%). Coverage of one or both surfaces of these internally sized paper substrates with these coating compositions may be sufficient to provide coverage of the metal salt drying agent on each of the respective surfaces treated of, for example, from about 0.2 to about 1.2 gsm (e.g., from about 0.5 to about 1 gsm, of the metal salt drying agent).

Embodiments of the coating compositions used in these methods may comprise the metal salt drying agent in an amount of, for example, from about 1 to about 40% by weight (e.g., from about 5 to about 25% by weight) of the composition (on a solids basis). In addition to the metal salt drying agent, embodiments of the coating composition used in these methods may also optionally comprise one or more of the following: a calcium carbonate pigment component in an amount of up to about 25% by weight (e.g., from about from about 10 to about 60% by weight) of the composition (on a solids basis); a surface paper sizing agent in amount of up to about 5% by weight (e.g., from about from about 0.5 to about 2% by weight) of the composition (on a solids basis); a cationic dye fixing agent in an amount up to about 20% by weight (e.g., from about 5 to about 15% by weight) of the composition (on a solids basis); a pigment binder in an amount of up to about 90% by weight (e.g., from about 5 to about 75% by weight) of the composition (on a solids basis); a plastic pigment in an amount of up to about 30% by weight (e.g., from 0 to about 20% by weight) of the composition (on a solids basis); and an optical brightening agent in an amount of up to about 30% by weight (e.g., from about 0 to about 10% by weight) of the composition (on a solids basis).

The coating composition may comprise from about 7 to about 25% solids (e.g., from about 8 to about 16% solids). The amount of solids applied from the coating composition to the paper substrate surfaces (also referred to as "dry pickup") may, for example, be in the range of from about 40 to about 240 lbs/ton for a paper substrate with basis weight of 20 lbs/1300 square feet (e.g., from about 50 to about 150 lbs/ton). These dry pickups are equivalent to amounts in the range of from about 1.5 to about 9 grams per square meter (gsm) for a paper substrate with basis weight of 20 lbs/1300 square feet (e.g., from about 2 to about 6 gsm).

An embodiment of a method of the present invention for treating one or both surfaces of the paper substrate with the coating composition comprising the metal salt drying agent (plus any other optional ingredients) is further illustrated in FIG. 1. Referring to FIG. 1, an embodiment of a system for carrying out an embodiment of the method of the present invention is illustrated which may be in the form of, for example a rod metering size press indicated generally as 100. Size press 100 may be used to coat a paper substrate, indicated generally as 104. Substrate 104 moves in the direction indicated by arrow 106, and which has a pair of opposed sides or surfaces, indicated, respectively, as 108 and 112.

Size press 100 includes a first assembly, indicated generally as 114, for applying the coating composition to surface 108. Assembly 114 includes a first reservoir, indicated generally as 116, provided with a supply of a coating composition, indicated generally as 120. A first take up roll, indicated generally as 124 which may rotate in a counterclockwise direction, as indicated by curved arrow 128, picks up an amount of the coating composition from supply 120. This amount of coating composition that is picked up by rotating roll 124 may then be transferred to a first applicator roll, indicated generally as 132, which rotates in the opposite and clockwise direction, as indicated by curved arrow 136. (The positioning of first take up roll 124 shown in FIG. 1 is simply illustrative and roll 124 may be positioned in various ways relative to first applicator roll 132 such that the coating composition is transferred to the surface of applicator roll 132.) The amount of coating composition that is transferred to first applicator roll 132 may be controlled by metering rod 144 which spreads the transferred composition on the surface of applicator roll 132, thus providing relatively uniform and consistent thickness of a first coating, indicated as 148, when applied onto the first surface 108 of substrate 104 by applicator roll 232.

As shown in FIG. 1, size press 100 may also be provided with a second assembly indicated generally as 152, for applying the coating composition to surface 112. Assembly 152 includes a second reservoir indicated generally as 156, provided with a second supply of a coating composition, indicated generally as 160. A second take up roll, indicated generally as 164 which may rotate in a clockwise direction, as indicated by curved arrow 168, picks up an amount of the coating composition from supply 160. This amount of coating composition that is picked up by rotating roll 164 may then be transferred to second take up roll, indicated generally as 172, which rotates in the opposite and counterclockwise direction, as indicated by curved arrow 176. As indicated in FIG. 1 by the dashed-line box and arrow 176, second take up roll 164 may be positioned in various ways relative to second applicator roll 172 such that the coating composition is transferred to the surface of applicator roll 172. The amount of coating composition that is transferred to second applicator roll 172 may be controlled by a second metering rod 184 which spreads the transferred composition on the surface of applicator roll 172, thus providing relatively uniform and consistent thickness of the second coating, indicated as 188, when applied onto the second surface 112 of substrate 104 by applicator roll 172.

EXAMPLES

Several embodiments of coating compositions may be prepared from the ingredients shown in Table 1 below:

TABLE 1

| Coating Composition | Sodium Chloride (parts) | Calcium Chloride (parts) | Water (parts) |
| --- | --- | --- | --- |
| 1 | 0 | 2.5 | 97.5 |
| 2 | 0 | 5 | 95 |
| 3 | 0 | 10 | 90 |
| 4 | 2.5 | 0 | 97.5 |
| 5 | 5 | 0 | 95 |
| 6 | 10 | 0 | 90 |
| 7 | 1.88 | 6.3 | 97.5 |
| 8 | 3.75 | 1.25 | 95 |
| 9 | 7.5 | 2.5 | 90 |
| 10 | 6.3 | 1.88 | 97.5 |
| 11 | 2.5 | 2.5 | 95 |
| 12 | 1.25 | 3.75 | 95 |

The coating compositions shown in Table 1 above may be prepared using a low shear mixer. The indicated amount of water is added to a coating container, followed by the metal salt drying agent (calcium chloride, sodium chloride or a blend of sodium chloride and calcium chloride). The target coating solids for these coating compositions is in the range of from about 2.5 to about 10%.

Commercially available uncoated paper substrates are coated with the coating compositions from Table 1. The properties of these commercially available uncoated paper substrates are shown in Table 2 below:

TABLE 2

| Code Name | Commercial Name | HST Value (seconds) | Basis Weigh (gsm) |
| --- | --- | --- | --- |
| A | Office Max MaxBrite | 20 | ~75 |
| B | Xerox Premium Multipurpose | 61 | ~75 |
| C | Hewlett Packard Multipurpose | 157 | ~75 |
| D | Hewlett Packard Everyday Ink Jet | 218 | ~80 |

In lab trials of treating the paper substrates with the coating compositions, both ends of a 9"×12" paper substrate sheet are taped to a backing sheet, the coating composition is applied in a thin line above the sheet, and a Meyer rod is drawn down the sheet in a uniform manner. By controlling the coating composition solids and rod size, a pickup weight of from 0.25 to 1.0 gsm may be achieved.

Example 1

Using the lab trial coating procedure described above, paper substrates Codes A through D (see Table 2) are treated with water (no salt), Coating Composition 2 (0.5 gsm of calcium chloride, see Table 1) or Coating Composition 5 (0.5 gsm of sodium chloride, see Table 1). The dry time, as measured by percentage of ink transfer (Ink Transfer (%)), is determined for each paper substrate. The results are shown in Table 3 below:

TABLE 3

| Paper Substrate | HST Value (seconds) | Salt | IT % |
|---|---|---|---|
| A | 20 | No | 1 |
| B | 61 | No | 46 |
| C | 157 | No | 76 |
| D | 218 | No | 87 |
| A | 20 | 0.5 gsm $CaCl_2$ | 3 |
| B | 61 | 0.5 gsm $CaCl_2$ | 18 |
| C | 157 | 0.5 gsm $CaCl_2$ | 43 |
| D | 218 | 0.5 gsm $CaCl_2$ | 71 |
| A | 20 | 0.5 gsm NaCl | 0 |
| B | 61 | 0.5 gsm NaCl | 17 |
| C | 157 | 0.5 gsm NaCl | 65 |
| D | 218 | 0.5 gsm NaCl | 76 |

Figure 2:
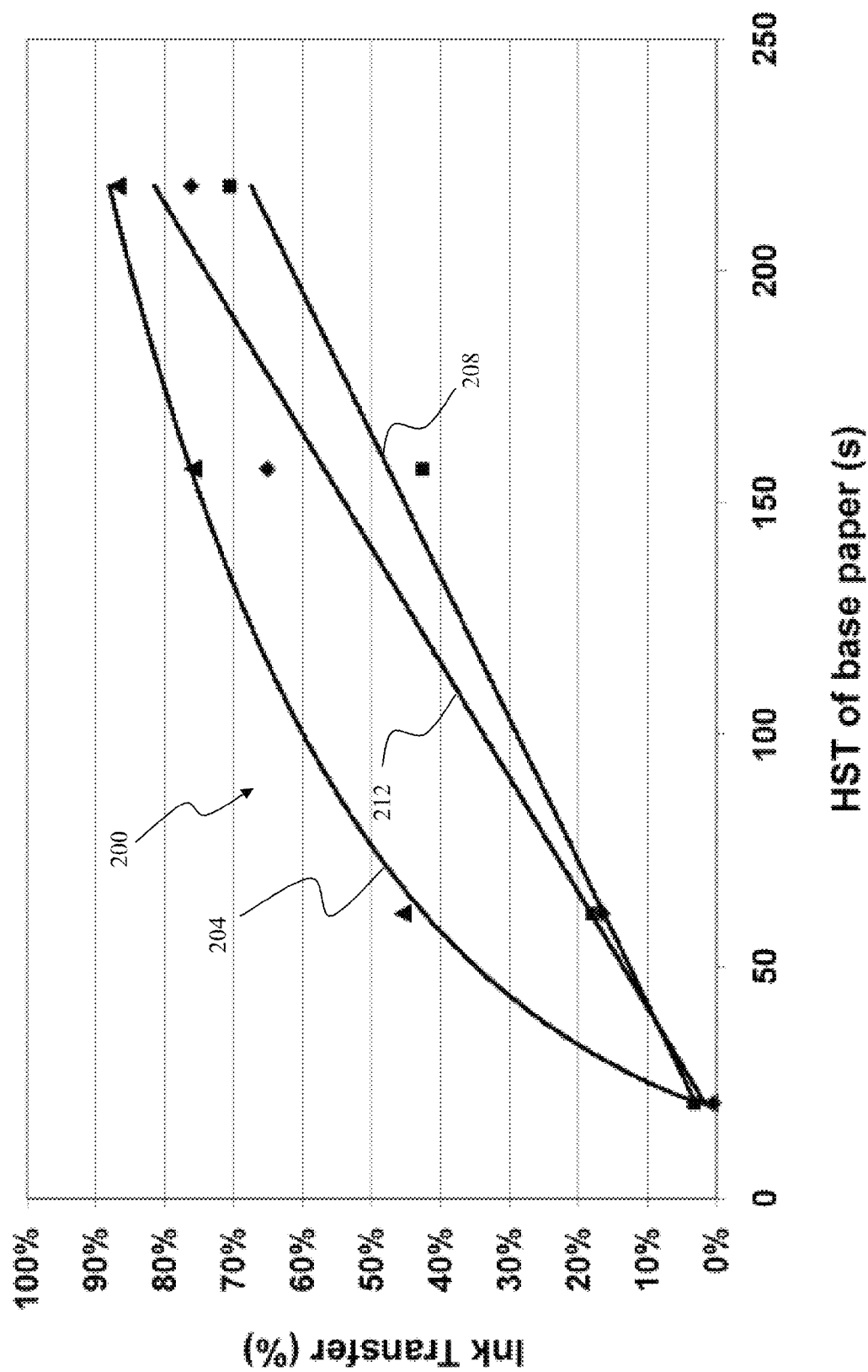
FIG. 2 shows graphical plots of dry time, as measured by percentage of ink transfer (Ink Transfer %), versus the HST value of the paper substrate (base paper), measured in seconds (s), of paper substrates treated with water (no salt), 0.5 gsm of calcium chloride and 0.5 gsm of sodium chloride.

FIG. 2 shows graphical plots, indicated generally as 200, of the results from Table 3 above of Ink Transfer (%) values, versus the HST value of the paper substrate (base paper), treated with water/no salt (triangles), 0.5 gsm of calcium chloride (squares), and 0.5 gsm of sodium chloride (diamonds). Line 204 is a fitted plot of the Ink Transfer (%) values measured for paper substrates treated with water (no salt). Line 208 is a fitted plot of the Ink Transfer (%) values measured for paper substrates treated with 0.5 gsm of calcium chloride. Line 212 is a fitted plot of the Ink Transfer (%) values measured for paper substrates treated with 0.5 gsm of sodium chloride. Plot 204 (no salt) provides a logarithmic curve of dry time values versus HST values, suggesting that the dry time is determined by the rate of diffusion of the ink carrier (water, solvents, surfactants, etc.) into the paper, and that this rate is slower than the rate of diffusion of the HST test fluid (i.e., water soluble dye in an acidic water solution). This diffusion process is faster at lower HST values for the paper substrate and becomes increasingly slower as the HST value of the paper substrate increases. By comparison, plots 208 (0.5 gsm of calcium chloride) and 212 (0.5 gsm of sodium chloride) provide more linear curves, suggesting that: (a) the absorption rate of the ink vehicle is proportional to the rate of absorption of the HST test fluid; (b) the metal drying salt (calcium or sodium chloride) on the paper surface precipitates the pigment in the ink due to the metal drying salt being more soluble than the pigment emulsion; and (c) once the pigment in the ink precipitates out of solution, the pigment no longer competes for the water in the ink vehicle so that the ink vehicle is free to soak into and be absorbed by the paper substrate. In addition, a comparison of plots 208 and 212 to plot 204 suggest that significantly faster dry times (i.e., lower IT % values) may be achieved by treatment of the papers substrates with metal drying salts (calcium chloride or sodium chloride) within the intermediate HST value of from about 50 to about 250 seconds, relative to paper substrates which are not treated with metal drying salts. If extrapolated, plot 204 (no salt) and plot 212 (0.5 gsm of sodium chloride) also appear to meet or intersect at an HST value of around 250 seconds. Accordingly, for paper substrates having an HST value above about 250 seconds, treatment with sodium chloride may not provide any measurable benefit in terms of Ink Transfer (%), i.e., improving dry time.

Example 2

Using the lab trial coating procedure described above, paper substrates having HST values of 20, 61, 157, and 218 seconds are treated with water (no salt), Coating Composition 1 (0.25 gsm of calcium chloride, see Table 1), Coating Composition 2 (0.5 gsm of calcium chloride, see Table 1) or Coating Composition 3 (1.0 gsm of calcium chloride, see Table 1). The dry time, as measured by percentage of ink transfer (Ink Transfer (%)), is determined for each paper substrate. The results are shown in Table 4 below:

TABLE 4

| Paper Substrate | HST Value (seconds) | Salt | IT % |
|---|---|---|---|
| A | 20 | No | 1 |
| A | 20 | 0.25 gsm $CaCl_2$ | 3.7 |
| A | 20 | 0.5 gsm $CaCl_2$ | 3.3 |
| A | 20 | 1.0 gsm $CaCl_2$ | 3.8 |
| B | 61 | No | 46 |
| B | 61 | 0.25 gsm $CaCl_2$ | 20 |
| B | 61 | 0.5 gsm $CaCl_2$ | 18 |
| B | 61 | 1.0 gsm $CaCl_2$ | 27 |
| C | 157 | No | 76 |
| C | 157 | 0.25 gsm $CaCl_2$ | 59 |
| C | 157 | 0.5 gsm $CaCl_2$ | 43 |
| C | 157 | 1.0 gsm $CaCl_2$ | 49 |
| D | 218 | No | 87 |
| D | 218 | 0.25 gsm $CaCl_2$ | 58 |
| D | 218 | 0.5 gsm $CaCl_2$ | 71 |
| D | 218 | 1.0 gsm $CaCl_2$ | 68 |

Figure 3:
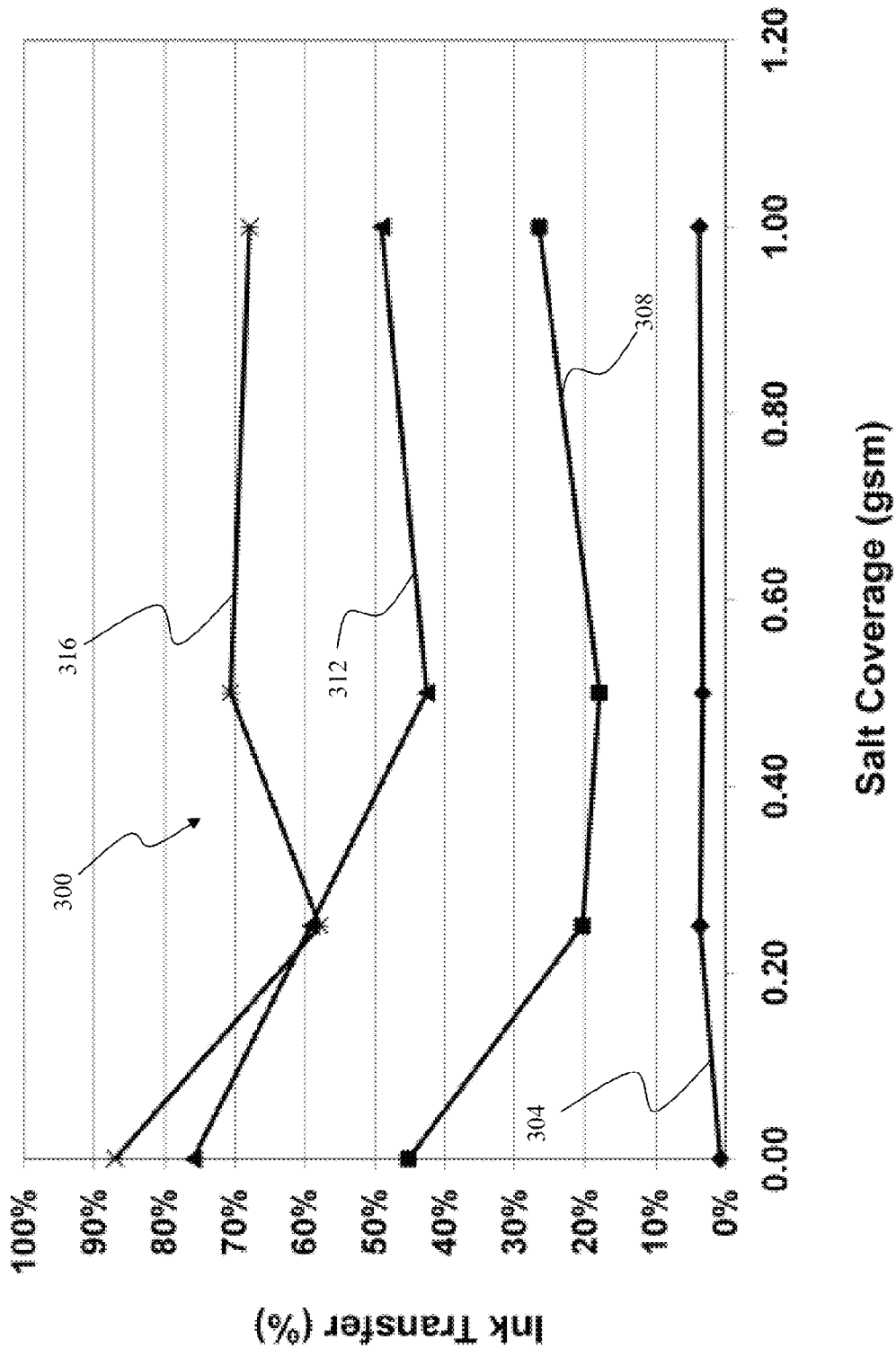
FIG. 3 shows graphical plots of dry time, as measured by percentage of ink transfer (Ink Transfer %), versus varying calcium chloride salt coverage (in gsm), of paper substrates having differing HST values.

FIG. 3 shows graphical plots, indicated generally as 300, of the results from Table 4 above of Ink Transfer (%) values, versus calcium chloride salt coverage, for the paper substrates having HST values of 20 seconds (diamonds), 61 seconds (squares), 157 seconds (triangles) and 218 seconds (asterisks). Line 304 is the plot of the Ink Transfer (%) values measured for the 20 second HST value paper substrate over the calcium chloride salt coverage range. Line 308 is the plot of the Ink Transfer (%) values measured for the 61 second HST value paper substrate over the calcium chloride salt coverage range. Line 312 is the plot of the Ink Transfer (%) values measured for the 157 second HST value paper substrate over the calcium chloride salt coverage range. Line 316 is the plot of the Ink Transfer (%) values measured for the 218 second HST value paper substrate over the calcium chloride salt coverage range. A comparison of plots 304, 308, 312, and 316 shows the following: (a) for paper substrates which are not treated with calcium chloride, dry time generally increases (i.e., IT % values are higher) as the HST values of the paper substrate increase; (b) for paper substrates having HST values of 61 and 157, dry times generally decrease (i.e., IT % values are lower) as calcium chloride coverage increases from 0 to 0.5 gsm and then slightly increases (i.e., IT % values are slightly higher) as calcium chloride coverage increases from 0.5 to 1.0 gsm; and (c) for the paper substrate having an HST value of 218, dry times decrease (i.e., IT % values are lower) and then level off as calcium chloride coverage increases from 0.25 to 1.0 gsm. Plots 304, 308, 312, and 316 also show the interrelationship of (interaction between) the HST value of the paper substrate and coverage with the metal drying salt. For example, comparable dry times (i.e., IT % values below 50%) may be achieved with a paper substrate having an HST of value of 61 seconds without treatment with a metal drying salt, or with a paper substrate having an HST of value of 157 seconds treated with at least 0.5 gsm of calcium chloride. By contrast, if the paper substrate has an HST value of 218, then dry times (IT % values) below 50% may not be achievable with calcium chloride coverage even as high as 1.0 gsm.

Example 3

Using the lab trial coating procedure described above, paper substrates having HST values of 20, 61, 157, and 218 seconds are treated with water (no salt), Coating Composition 4 (0.5 gsm of sodium chloride, see Table 1), Coating Composition 5 (0.5 gsm of sodium chloride, see Table 1) or Coating Composition 6 (1.0 gsm of sodium chloride, see Table 1). The dry time, as measured by percentage of ink transfer (Ink Transfer (%)), is determined for each paper substrate. The results are shown in Table 5 below:

TABLE 5

| Paper Substrate | HST Value (seconds) | Salt | IT % |
|---|---|---|---|
| A | 20 | No | 1 |
| A | 20 | 0.25 gsm NaCl | 0.5 |
| A | 20 | 0.5 gsm NaCl | 0.5 |
| A | 20 | 1.0 gsm NaCl | 1.3 |
| B | 61 | No | 46 |
| B | 61 | 0.25 gsm NaCl | 21 |
| B | 61 | 0.5 gsm NaCl | 17 |
| B | 61 | 1.0 gsm NaCl | 32 |
| C | 157 | No | 76 |
| C | 157 | 0.25 gsm NaCl | 80 |
| C | 157 | 0.5 gsm NaCl | 65 |
| C | 157 | 1.0 gsm NaCl | 35 |
| D | 218 | No | 87 |
| D | 218 | 0.25 gsm NaCl | 75 |
| D | 218 | 0.5 gsm NaCl | 76 |
| D | 218 | 1.0 gsm NaCl | 72 |

Figure 4:
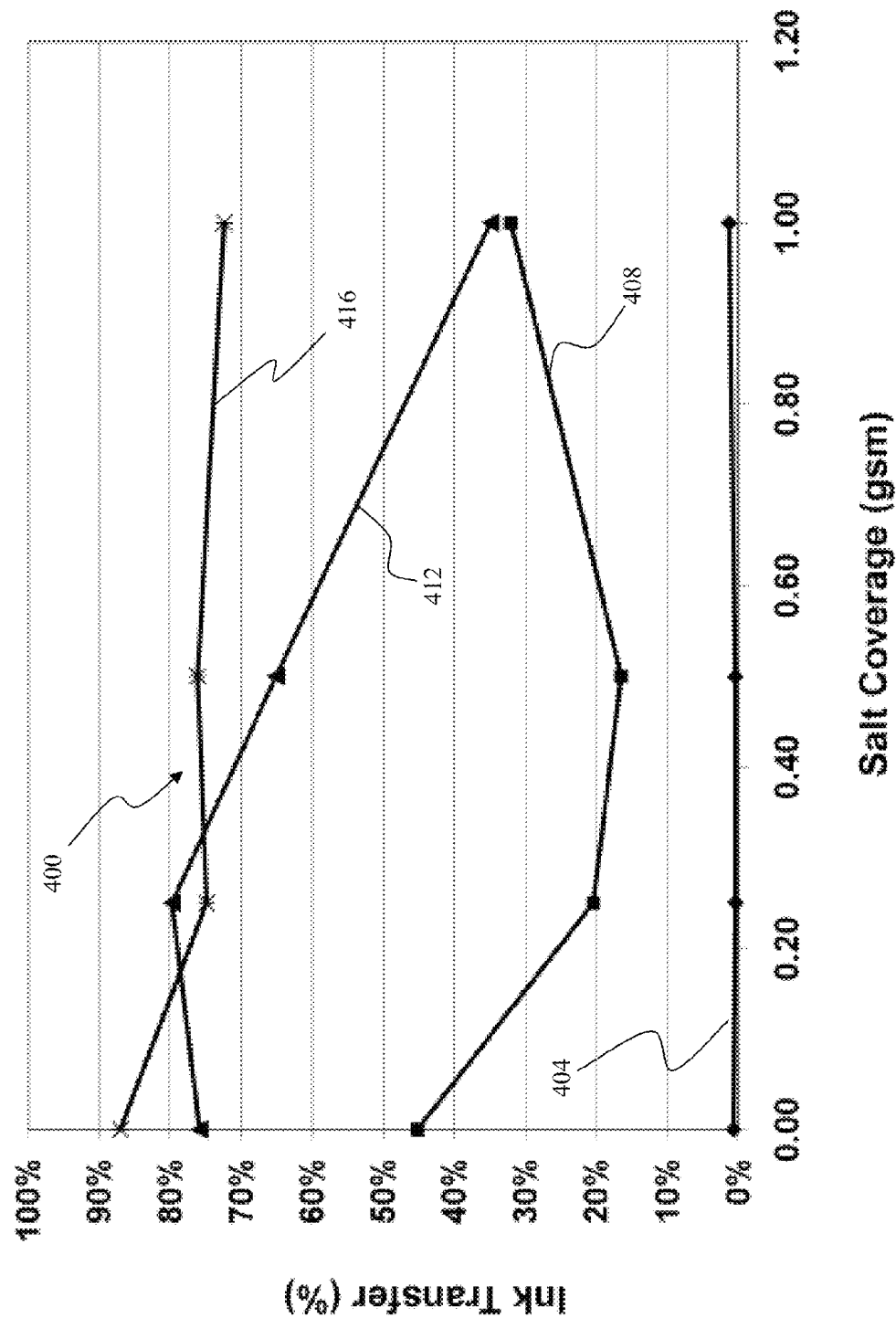
FIG. 4 shows graphical plots of dry time, as measured by percentage of ink transfer (Ink Transfer %), versus varying sodium chloride salt coverage (in gsm), of paper substrates having differing HST values.

FIG. 4 shows graphical plots, indicated generally as 400, of the results from Table 5 above of Ink Transfer (%) values, versus sodium chloride salt coverage, for the paper substrates having HST values of 20 seconds (diamonds), 61 seconds (squares), 157 seconds (triangles) and 218 seconds (asterisks). Line 404 is the plot of the Ink Transfer (%) values measured for the 20 second HST value paper substrate over the sodium chloride salt coverage range. Line 408 is the plot of the Ink Transfer (%) values measured for the 61 second HST value paper substrate over the sodium chloride salt coverage range. Line 412 is the plot of the Ink Transfer (%) values measured for the 157 second HST value paper substrate over the sodium chloride salt coverage range. Line 416 is the plot of the Ink Transfer (%) values measured for the 218 second HST value paper substrate over the sodium chloride salt coverage range. A comparison of plots 404, 408, 412, and 416 shows the following: (a) for paper substrates which are not treated with sodium chloride, dry time generally increases (i.e., IT % values are higher) as HST values of the paper substrate increase; (b) for the paper substrate having intermediate HST values of 61 and 157, dry times greatly decrease (i.e., IT % values are significantly lower) as sodium chloride coverage reaches 1.0 gsm; (c) dry times are greatly decreased (i.e., IT % values are greatly lower) for the paper substrate having an HST value of 61 over the sodium chloride coverage range of from 0.25 to 1.0 gsm; and (d) at an HST value of 218 for the paper substrate, dry times decrease minimally (i.e., IT % values are generally higher) over the sodium chloride coverage range of from 0.25 to 1.0 gsm. In addition, a comparison of plots 404, 408, 412, and 416 (FIG. 4) with plots 304, 308, 312, and 316 (FIG. 3) suggests that treatment with sodium chloride as the metal drying salt may provide better dry times (i.e., lower IT % values) compared to calcium chloride for paper substrates having lower HST values (e.g., 20 seconds), and may provide comparable dry times (in terms of IT % values) at higher HST values of 61, 157 and 218 seconds, Example 4

Using the lab trial coating procedure described above, paper substrates Codes A through D (see Table 2) are treated with water (no salt), Coating Composition 2 (0.5 gsm of calcium chloride, see Table 1), Coating Composition 8 (0.5 gsm of a 3:1 sodium chloride:calcium chloride salt blend, see Table 1), Coating Composition 11 (0.5 gsm of a 1:1 sodium chloride:calcium chloride salt blend, see Table 1), or Coating Composition 12 (0.5 gsm of a 1:3 sodium chloride:calcium chloride salt blend, see Table 1). The dry time, as measured by percentage of ink transfer (Ink Transfer (%)), is determined for each paper substrate. is determined for each paper substrate. The results are shown in Table 6 below:

TABLE 6

| Paper Substrate | HST Value (seconds) | Salt | IT % |
|---|---|---|---|
| A | 20 | No | 1 |
| B | 61 | No | 46 |
| C | 157 | No | 76 |
| D | 218 | No | 87 |
| A | 20 | 0.5 gsm CaCl$_2$ | 3 |
| B | 61 | 0.5 gsm CaCl$_2$ | 18 |
| C | 157 | 0.5 gsm CaCl$_2$ | 43 |
| D | 218 | 0.5 gsm CaCl$_2$ | 71 |
| A | 20 | 0.5 gsm 3:1 Blend | 2 |
| B | 61 | 0.5 gsm 3:1 Blend | 11 |
| C | 157 | 0.5 gsm 3:1 Blend | 59 |
| D | 218 | 0.5 gsm 3:1 Blend | 42 |
| A | 20 | 0.5 gsm 1:1 Blend | 3 |
| B | 61 | 0.5 gsm 1:1 Blend | 15 |
| C | 157 | 0.5 gsm 1:1 Blend | 54 |
| D | 218 | 0.5 gsm 1:1 Blend | 51 |
| A | 20 | 0.5 gsm 1:3 Blend | 2 |
| B | 61 | 0.5 gsm 1:3 Blend | 18 |
| C | 157 | 0.5 gsm 1:3 Blend | 41 |
| D | 218 | 0.5 gsm 1:3 Blend | 67 |

Figure 5:
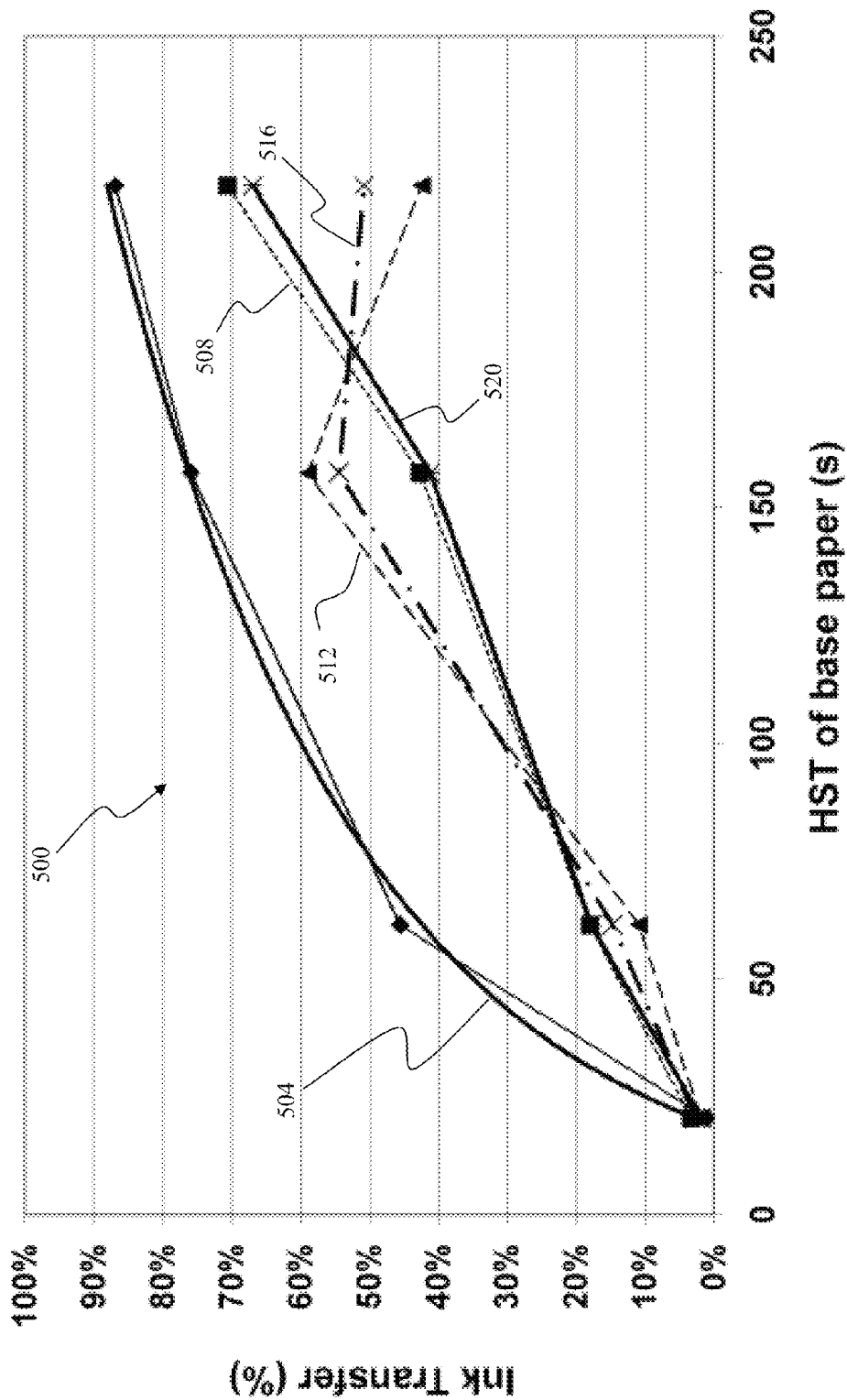
FIG. 5 shows graphical plots of dry time, as measured by percentage of ink transfer (Ink Transfer %), versus the HST value of the paper substrate (base paper), measured in seconds (s), of paper substrates treated with water (no salt), 0.5 gsm of calcium chloride, 0.5 gsm of a 3:1 sodium chloride:calcium chloride salt blend, 0.5 gsm of a 1:1 sodium chloride:calcium chloride salt blend, and 0.5 gsm of a 1:3 sodium chloride:calcium chloride salt blend.

FIG. 5 shows graphical plots, indicated generally as 500, of the results from Table 6 above of Ink Transfer (%) values, versus the HST value of the paper substrate (base paper), of paper substrates treated with no salt (diamonds), 0.5 gsm of calcium chloride (squares), 0.5 gsm of the 3:1 sodium chloride:calcium chloride salt blend (triangles), 0.5 gsm of the 1:1 sodium chloride:calcium chloride salt blend (xs), and 0.5 gsm of the 1:3 sodium chloride:calcium chloride salt blend (asterisks). Line 504 is the logarithmic plot of the Ink Transfer (%) values measured for paper substrates treated with no salt. Dotted line 508 is the plot of the Ink Transfer (%) values measured for paper substrates treated with 0.5 gsm of calcium chloride. Dashed line 512 is the plot of the Ink Transfer (%) values measured for paper substrates treated with 0.5 gsm of the 3:1 sodium chloride:calcium chloride salt blend. Dashed-dotted line 516 is the plot of the Ink Transfer (%) values measured for paper substrates treated with 0.5 gsm of the 1:1 sodium chloride:calcium chloride salt blend. Line 520 is the plot of the Ink Transfer (%) values measured for paper substrates treated with 0.5 gsm of the 1:3 sodium chloride:calcium chloride salt blend. A comparison of plots 512, 516, and 520 (sodium chloride:calcium chloride salt blends) to plot 508 (calcium chloride only) shows comparable dry times for paper substrates having intermediate HST values of 61 and 157 seconds. In fact, a comparison of plot 520 (1:3 sodium chloride:calcium chloride salt blend) to plot 508 (calcium chloride only) shows substantially equivalent dry times for paper substrates having intermediate HST values of 61 and 157, as does a comparison of plot 512 (3:1 sodium chloride:calcium chloride salt blend) to plot 516 (1:1 sodium chloride:calcium chloride salt blend).

Example 5

Using the lab trial coating procedure described above, paper substrates Codes A through D (see Table 2) are treated with water (no salt), Coating Composition 2 (0.5 gsm of calcium chloride, see Table 1) or Coating Composition 5 (0.5 gsm of sodium chloride, see Table 1). The black print density, as measured by optical density (Black Density (OD)), is determined for each paper substrate. The results are shown in Table 7 below:

TABLE 7

| Paper Substrate | HST Value (seconds) | Salt | Black Density (OD) |
|---|---|---|---|
| A | 20 | No | 0.99 |
| B | 61 | No | 1.15 |
| C | 157 | No | 1.21 |
| D | 218 | No | 1.42 |
| A | 20 | 0.5 gsm $CaCl_2$ | 1.61 |
| B | 61 | 0.5 gsm $CaCl_2$ | 1.65 |
| C | 157 | 0.5 gsm $CaCl_2$ | 1.64 |
| D | 218 | 0.5 gsm $CaCl_2$ | 1.62 |
| A | 20 | 0.5 gsm NaCl | 1.36 |
| B | 61 | 0.5 gsm NaCl | 1.59 |
| C | 157 | 0.5 gsm NaCl | 1.57 |
| D | 218 | 0.5 gsm NaCl | 1.62 |

Figure 6:
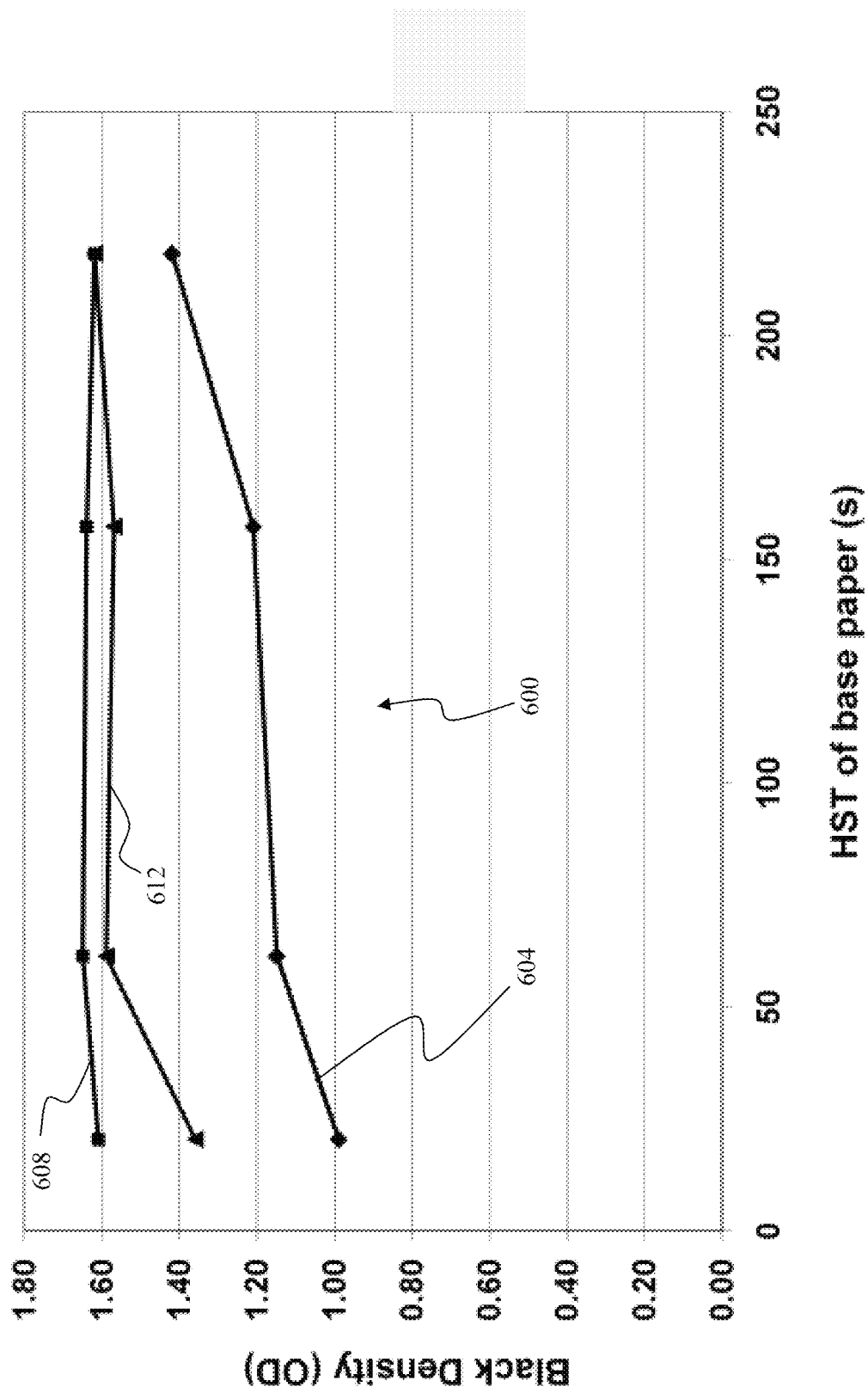
FIG. 6 shows graphical plots of black print density, as measured by optical density (Black Density (OD)), versus the HST value of the paper substrate (base paper), measured in seconds (s), of paper substrates treated with water (no salt), 0.5 gsm of calcium chloride and 0.5 gsm of sodium chloride.

FIG. 6 shows graphical plots, indicated generally as 600, of the results from Table 7 above of Black Density (OD)) values, versus the HST value of the paper substrate (base paper), of paper substrates treated with no salt (diamonds), 0.5 gsm of calcium chloride (squares), and 0.5 gsm of sodium chloride (triangles). Line 604 is the plot of the Black Density (OD) values measured for paper substrates treated with no salt. Line 608 is the plot of the Black Density (OD) values measured for paper substrates treated with 0.5 gsm of calcium chloride. Line 612 is the plot of the Black Density (OD) values measured for paper substrates treated with 0.5 gsm of sodium chloride. A comparison of plots 604, 608, and 612 generally shows that black print density is increased (i.e., OD values are higher), especially for the paper substrates having an intermediate HST value of 61 seconds versus paper substrates having low HST value of 20 seconds, when treated with 0.5 gsm metal drying salt (calcium chloride or sodium chloride) versus no salt treatment. A comparison of plots 608 and 612 also shows that the black print density may be similar for paper substrates having intermediate HST values of 61, 157, and 218 seconds which are treated with either 0.5 gsm of calcium chloride or 0.5 gsm of sodium chloride.

Example 6

Using the lab trial coating procedure described above, paper substrates having HST values of 20, 61, 157, and 218 seconds are treated with water (no salt), Composition 1 (0.25 gsm of calcium chloride, see Table 1), Coating Composition 2 (0.5 gsm of calcium chloride, see Table 1) or Coating Composition 3 (1.0 gsm of calcium chloride, see Table 1). The black print density, as measured by optical density (Black Density (OD)), is determined for each paper substrate. The results are shown in Table 8 below:

TABLE 8

| Paper Substrate | HST Value (seconds) | Salt | Black Density (OD) |
|---|---|---|---|
| A | 20 | No | 0.99 |
| A | 20 | 0.25 gsm $CaCl_2$ | 1.62 |
| A | 20 | 0.5 gsm $CaCl_2$ | 1.61 |
| A | 20 | 1.0 gsm $CaCl_2$ | 1.59 |
| B | 61 | No | 1.15 |
| B | 61 | 0.25 gsm $CaCl_2$ | 1.68 |
| B | 61 | 0.5 gsm $CaCl_2$ | 1.65 |
| B | 61 | 1.0 gsm $CaCl_2$ | 1.64 |
| C | 157 | No | 1.21 |
| C | 157 | 0.25 gsm $CaCl_2$ | 1.63 |
| C | 157 | 0.5 gsm $CaCl_2$ | 1.64 |
| C | 157 | 1.0 gsm $CaCl_2$ | 1.62 |
| D | 218 | No | 1.42 |
| D | 218 | 0.25 gsm $CaCl_2$ | 1.63 |
| D | 218 | 0.5 gsm $CaCl_2$ | 1.62 |
| D | 218 | 1.0 gsm $CaCl_2$ | 1.59 |

Figure 7:
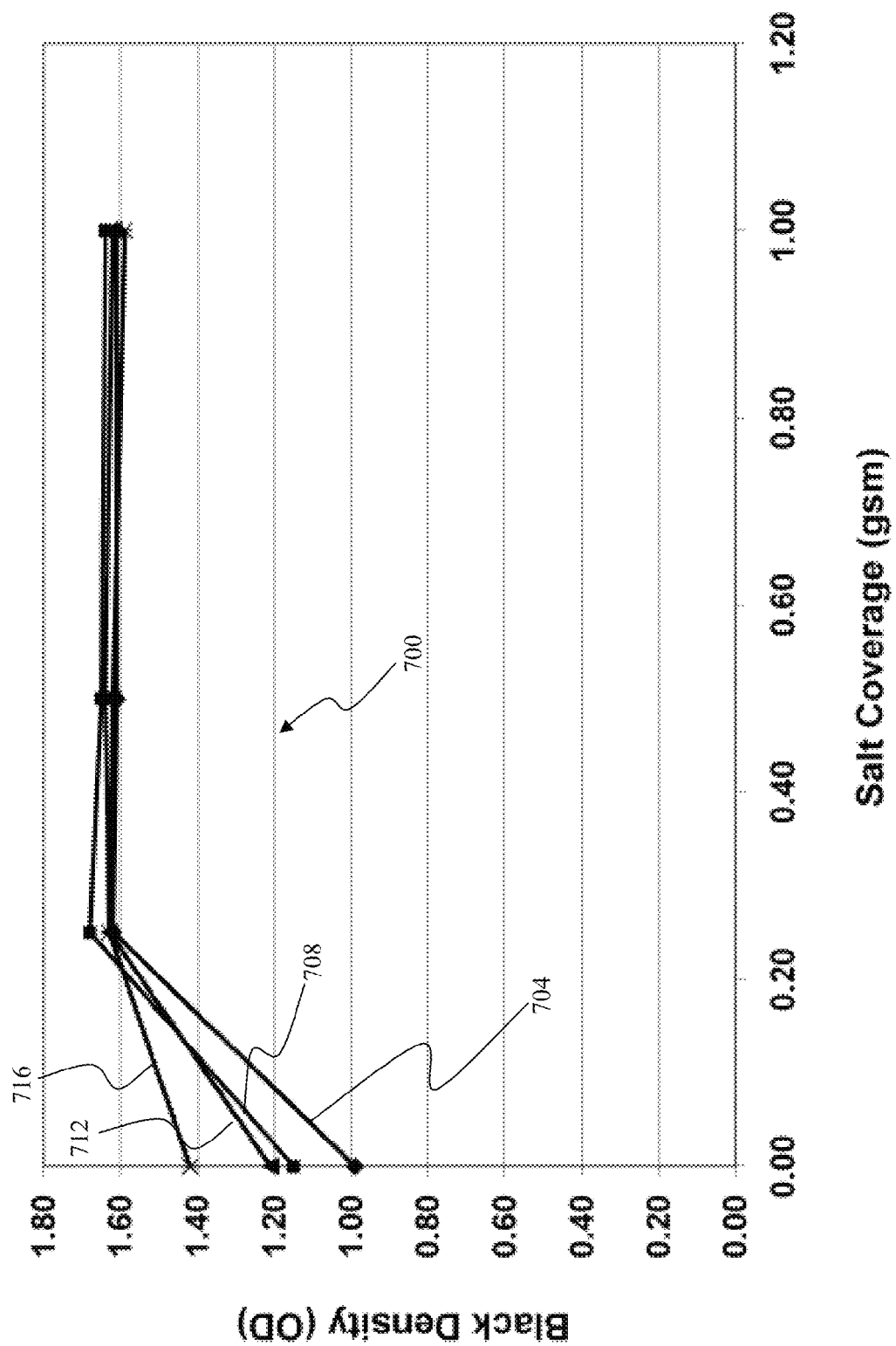
FIG. 7 shows graphical plots of black print density, as measured by optical density (Black Density (OD)), versus varying calcium chloride salt coverage (in gsm), of paper substrates having differing HST values.

FIG. 7 shows graphical plots, indicated generally as 700, of the results from Table 8 above of Black Density (OD) values, versus calcium chloride salt coverage, for the paper substrates having HST values of 20 seconds (diamonds), 61 seconds (squares), 157 seconds (triangles) and 218 seconds (asterisks). Line 704 is the plot of the Black Density (OD) values measured for the 20 second HST value paper substrate over the calcium chloride salt coverage range. Line 708 is the plot of the Black Density (OD) values measured for the 61 second HST value paper substrate over the calcium chloride salt coverage range. Line 712 is the plot of the Black Density (OD) values measured for the 157 second HST value paper substrate over the calcium chloride salt coverage range. Line 616 is the plot of the Black Density (OD) values measured for the 218 second HST value paper substrate over the calcium chloride salt coverage range. A comparison of plots 704, 708, 712, and 716 show that black print density is greatly increased (i.e., has a higher OD value) for paper substrates having HST values of 20 to 218 seconds when salt coverage is increased from 0 (no salt coverage) to 0.25 gsm. A comparison of plots 704, 708, 712, and 716 also show significant change in black print density over the calcium chloride coverage range of from 0.25 to 1.0 gsm for paper substrates having an HST value of from 20 to 218 seconds. A comparison of plots 708, 712, and 716 also shows that black print density may vary minimally (if at all) when the paper substrate is treated with calcium chloride over the range of salt coverage (from 0.25 to 1.0 gsm) and over the range of HST values (from 20 to 218 seconds) for the paper substrates treated.

Example 7

Using the lab trial coating procedure described above, paper substrates having HST values of 20, 61, 157, and 218 seconds are treated with water (no salt), Composition 4 (0.25 gsm of sodium chloride, see Table 1), Coating Composition 5 (0.5 gsm of sodium chloride, see Table 1) or Coating Composition 6 (1.0 gsm of sodium chloride, see Table 1). The black print density, as measured by optical density (Black Density (OD)), is determined for each paper substrate. The results are shown in Table 9 below:

TABLE 9

| Paper Substrate | HST Value (seconds) | Salt | Black Density (OD) |
|---|---|---|---|
| A | 20 | No | 0.99 |
| A | 20 | 0.25 gsm NaCl | 1.18 |
| A | 20 | 0.5 gsm NaCl | 1.36 |
| A | 20 | 1.0 gsm NaCl | 1.47 |
| B | 61 | No | 1.15 |
| B | 61 | 0.25 gsm NaCl | 1.58 |
| B | 61 | 0.5 gsm NaCl | 1.59 |
| B | 61 | 1.0 gsm NaCl | 1.58 |
| C | 157 | No | 1.21 |
| C | 157 | 0.25 gsm NaCl | 1.56 |
| C | 157 | 0.5 gsm NaCl | 1.57 |
| C | 157 | 1.0 gsm NaCl | 1.54 |
| D | 218 | No | 1.42 |
| D | 218 | 0.25 gsm NaCl | 1.63 |
| D | 218 | 0.5 gsm NaCl | 1.62 |
| D | 218 | 1.0 gsm NaCl | 1.58 |

Figure 8:
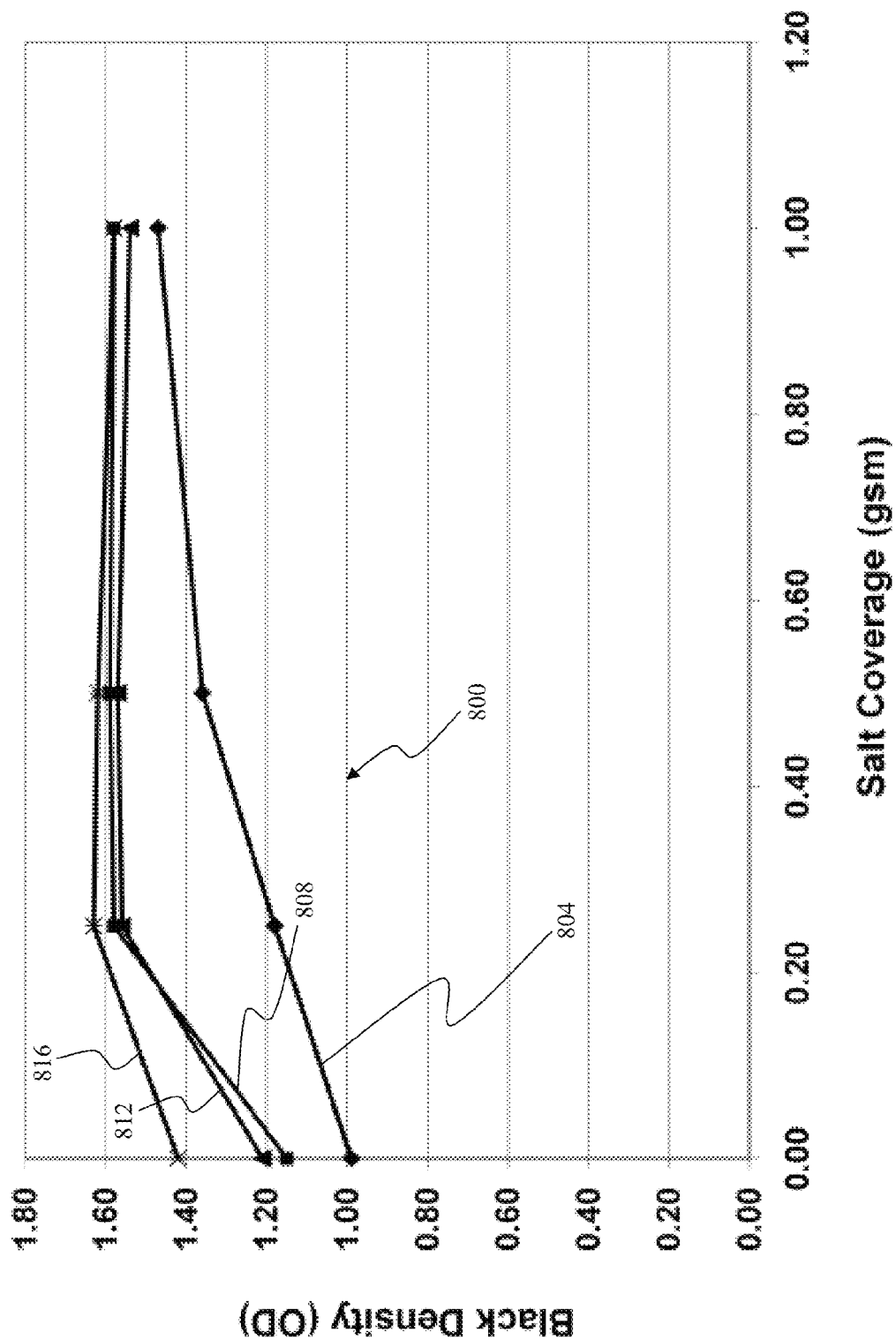
FIG. 8 shows graphical plots of black print density, as measured by optical density (Black Density (OD)), versus varying sodium chloride salt coverage (in gsm), of paper substrates having differing HST values.

FIG. 8 shows graphical plots, indicated generally as 800, of the results from Table 9 above of Black Density (OD) values, versus sodium chloride salt coverage, for the paper substrates having HST values of 20 seconds (diamonds), 61 seconds (squares), 157 seconds (triangles) and 218 seconds (asterisks). Line 804 is the plot of the Black Density (OD) values for the 20 second HST value paper substrate over the sodium chloride salt coverage range. Line 808 is the plot of the Black Density (OD) values for the 61 second HST value paper substrate over the sodium chloride salt coverage range. Line 812 is the plot of the Black Density (OD) values for the 157 second HST value paper substrate over the sodium chloride salt coverage range. Line 816 is the plot of the Black Density (OD) values for the 218 second HST value paper substrate over the sodium chloride salt coverage range. A comparison of plots 804, 808, 812, and 816 shows that black print density is greatly increased (i.e., has a higher OD value) for paper substrates having HST values of from 61 to 218 seconds when salt coverage is increased from 0 (no salt coverage) to 0.25 gsm. What a comparison plot 804 also shows (versus plots 808 through 816) is that black print density, while increasing with increasing sodium chloride salt coverage, may still be significantly lower for the paper substrate having an HST value of 20 seconds. By contrast, a comparison of plots 808, 812, and 816 shows that black print density may vary minimally (if at all) when the paper substrate is treated with sodium chloride over the range of salt coverage (0.25 to 1.0 gsm) and over the range of HST values of from 61 to 218 seconds) for the paper substrates treated. In fact, a comparison of plots 808, 812 and 816 (FIG. 8), with plots 708, 712, and 716 (FIG. 7), shows that paper substrates having intermediate HST values in the range of from 61 to 218 seconds which are treated with sodium chloride may have black print densities which are comparable to paper substrates in this HST value range which are treated with calcium chloride.

Example 8

Using the lab trial coating procedure described above, paper substrates having HST values of 20, 61, 157, and 218 seconds are treated with water (no salt), Coating Composition 2 (0.5 gsm of calcium chloride, see Table 1),), Coating Composition 10 (0.25 gsm of a 3:1 sodium chloride:calcium chloride salt blend, see Table 1), Coating Composition 12 (0.5 gsm of a 3:1 sodium chloride:calcium chloride salt blend, see Table 1), or Coating Composition 9 (1.0 gsm of a 3:1 sodium chloride:calcium chloride salt blend, see Table 1). The black print density, as measured by optical density (Black Density (OD)), is determined for each paper substrate. The results are shown in Table 10 below:

TABLE 10

| Paper Substrate | HST Value (seconds) | Salt | Black Density (OD) |
|---|---|---|---|
| A | 20 | No | 0.99 |
| B | 61 | No | 1.15 |
| C | 157 | No | 1.21 |
| D | 218 | No | 1.42 |
| A | 20 | 0.5 gsm CaCl$_2$ | 1.61 |
| B | 61 | 0.5 gsm CaCl$_2$ | 1.65 |
| C | 157 | 0.5 gsm CaCl$_2$ | 1.64 |
| D | 218 | 0.5 gsm CaCl$_2$ | 1.62 |
| A | 20 | 0.25 gsm 3:1 Blend | 1.46 |
| B | 61 | 0.25 gsm 3:1 Blend | 1.57 |
| C | 157 | 0.25 gsm 3:1 Blend | 1.57 |
| D | 218 | 0.25 gsm 3:1 Blend | 1.55 |
| A | 20 | 0.5 gsm 3:1 Blend | 1.54 |
| B | 61 | 0.5 gsm 3:1 Blend | 1.62 |
| C | 157 | 0.5 gsm 3:1 Blend | 1.60 |
| D | 218 | 0.5 gsm 3:1 Blend | 1.61 |
| A | 20 | 1.0 gsm 3:1 Blend | 1.59 |
| B | 61 | 1.0 gsm 3:1 Blend | 1.62 |
| C | 157 | 1.0 gsm 3:1 Blend | 1.60 |
| D | 218 | 1.0 gsm 3:1 Blend | 1.63 |

Figure 9:
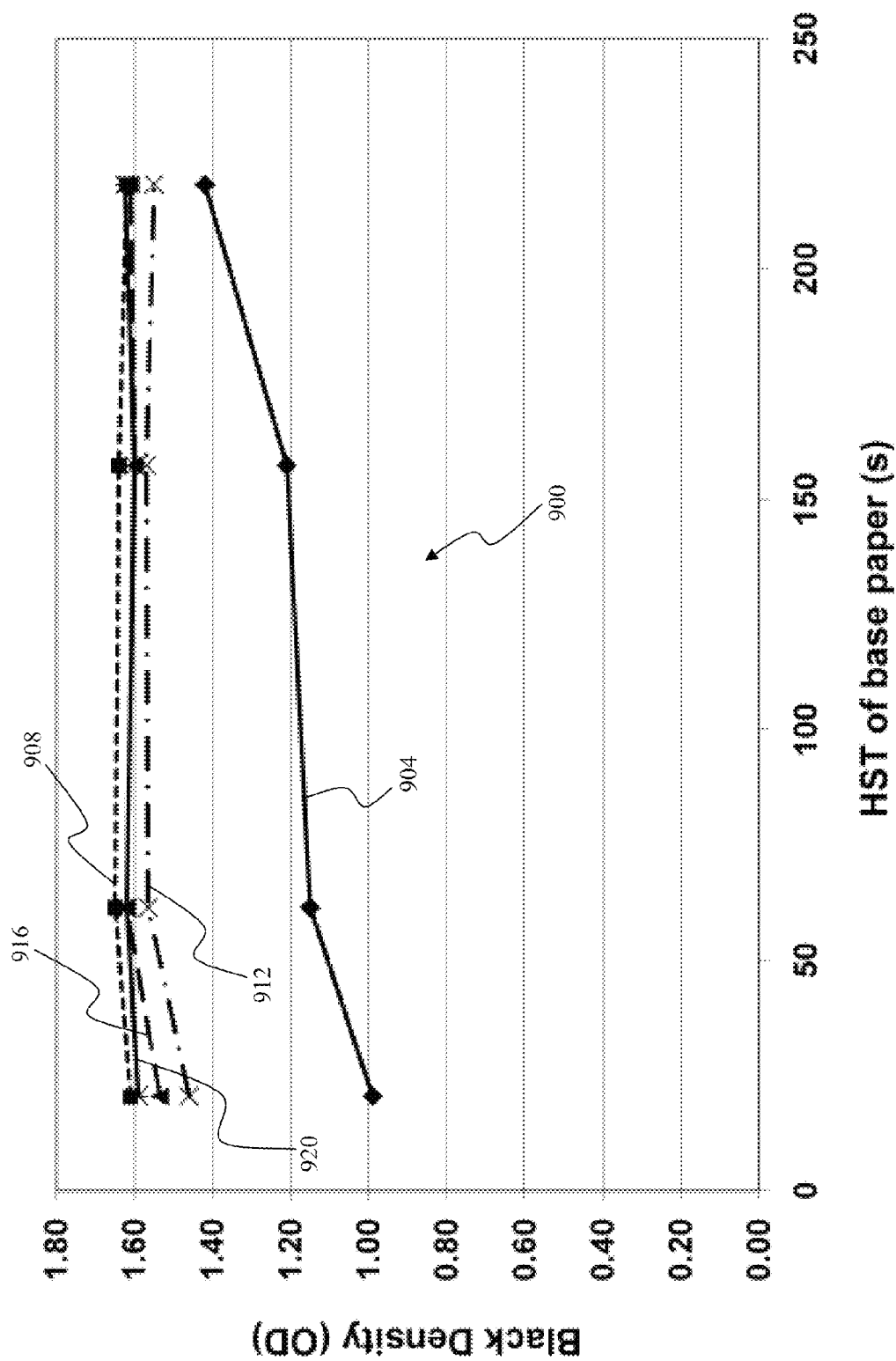
FIG. 9 shows graphical plots of black print density, as measured by optical density (Black Density (OD)), versus the HST value of the paper substrate (base paper), measured in seconds (s), of paper substrates treated with water (no salt), 0.5 gsm of calcium chloride, 0.25 gsm of a 3:1 sodium chloride:calcium chloride salt blend, 0.5 gsm of a 3:1 sodium chloride:calcium chloride salt blend, and 1.0 gsm of a 3:1 sodium chloride:calcium chloride salt blend.

FIG. 9 shows graphical plots, indicated generally as 900, of the results from Table 10 above of Black Density (OD) values, versus HST values of the paper substrate, of paper substrates treated with no salt (diamonds), 0.5 gsm of calcium chloride (squares), 0.25 gsm of the 3:1 sodium chloride:calcium chloride salt blend (xs), 0.5 gsm of the 3:1 sodium chloride:calcium chloride salt blend (triangles), and 1.0 gsm of the 3:1 sodium chloride:calcium chloride salt blend (asterisks). Line 904 is the plot of the Black Density (OD) values measured for paper substrates treated with no salt. Line 908 is the plot of the Black Density (OD) values measured for paper substrates treated with 0.5 gsm of calcium chloride. Line 912 is the plot of the Black Density (OD) values measured for paper substrates treated with 0.25 gsm of the 3:1 sodium chloride:calcium chloride salt blend. Line 916 is the plot of the Black Density (OD) values measured for paper substrates treated with 0.5 gsm of the 3:1 sodium chloride:calcium chloride salt blend. Line 920 is the plot of the Black Density (OD) values measured for paper substrates treated with 1.0 gsm of the 3:1 salt sodium chloride:calcium chloride blend. A comparison of plots 912, 916 and 920 (sodium chloride:calcium chloride salt blends) to plot 904 (no salt) shows that the black print density is much higher for paper substrates treated with the 3:1 sodium chloride:calcium chloride salt blends compared to the paper substrates treated with water only (no salt). A comparison of plots 912, 916 and 920 (sodium chloride:calcium chloride salt blends) to plot 908 (calcium chloride only) also shows that, while the black print density may be slightly lower for paper substrates treated with 0.25 gsm of the 3:1 sodium chloride:calcium chloride salt blend (or paper substrates having the low HST value of 20 seconds treated with this sodium chloride:calcium chloride salt blend compared such paper substrates treated with calcium chloride only), these black print densities are comparable to those for paper substrates treated with calcium chloride only for the paper substrates having the intermediate HST values of 61, 157, and 218 seconds, and that the black print density may approach that of the paper substrate treated with only 0.5 gsm of calcium chloride by increasing the coverage of the 3:1 sodium chloride:calcium chloride salt blend from 0.25 gsm to 1.0 gsm.

Example 9

Using the lab trial coating procedure described above, paper substrates Codes A through D (see Table 2) are treated with water (no salt), Coating Composition 2 (0.5 gsm of calcium chloride, see Table 1), Coating Composition 6 (0.5 gsm of sodium chloride, see Table 1), or Coating Composition 8 (0.5 gsm of a 3:1 salt blend of sodium chloride:calcium chloride, see Table 1). The edge acuity (EA) is determined for each paper substrate. The results are shown in Table 11 below:

TABLE 11

| Paper Substrate | HST Value (seconds) | Salt | Edge Acuity (EA) |
|---|---|---|---|
| A | 20 | No | 26.19 |
| B | 61 | No | 18.30 |
| C | 157 | No | 12.25 |
| D | 218 | No | 5.96 |
| A | 20 | 0.5 gsm $CaCl_2$ | 9.06 |
| B | 61 | 0.5 gsm $CaCl_2$ | 8.12 |
| C | 157 | 0.5 gsm $CaCl_2$ | 7.00 |
| D | 218 | 0.5 gsm $CaCl_2$ | 5.86 |
| A | 20 | 0.5 gsm NaCl | 29.06 |
| B | 61 | 0.5 gsm NaCl | 14.70 |
| C | 157 | 0.5 gsm NaCl | 13.10 |
| D | 218 | 0.5 gsm NaCl | 6.13 |
| A | 20 | 0.5 gsm 3:1 Blend | 22.92 |
| B | 61 | 0.5 gsm 3:1 Blend | 10.20 |
| C | 157 | 0.5 gsm 3:1 Blend | 7.62 |
| D | 218 | 0.5 gsm 3:1 Blend | 7.39 |

Figure 10:
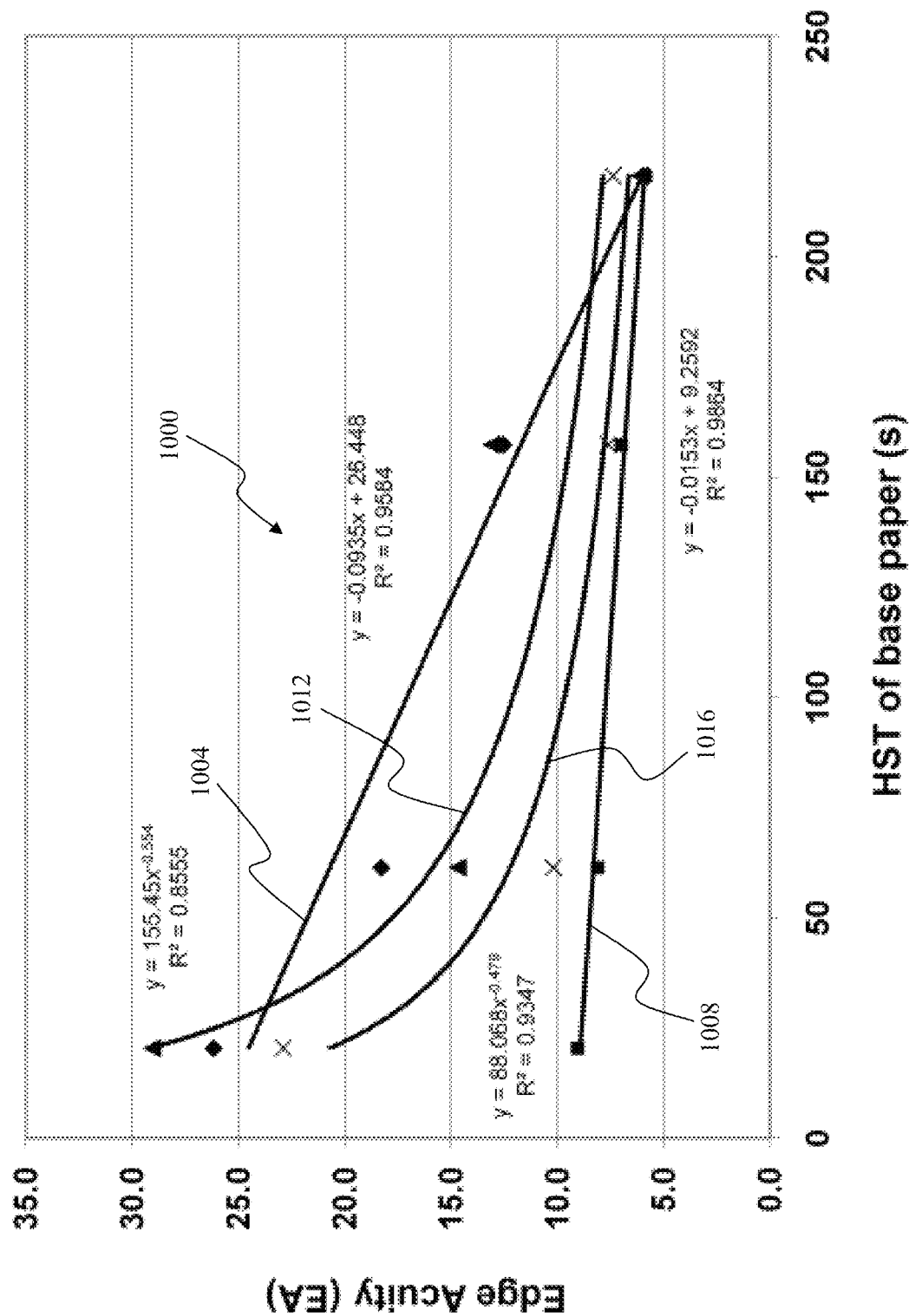
FIG. 10 shows graphical plots of edge acuity (EA), versus the HST value of the paper substrate (base paper), measured in seconds (s), of paper substrates treated with water (no salt), 0.5 gsm of calcium chloride, 0.5 gsm of sodium chloride, and 0.5 gsm of a 3:1 salt blend of sodium chloride:calcium chloride.

FIG. 10 shows graphical plots, indicated generally as 1000, of the results from Table 11 above of edge acuity (EA) values, versus the HST value of the paper substrate (base paper), of paper substrates treated with no salt (diamonds), 0.5 gsm of calcium chloride (squares), 0.5 gsm of sodium chloride (triangles), and 0.5 gsm of the 3:1 sodium chloride:calcium chloride salt blend (xs). Line 1004 is a fitted plot of EA values for paper substrates treated with no salt. Line 1008 is a fitted plot of EA values for paper substrates treated with 0.5 gsm of calcium chloride. Line 1012 is a fitted plot of EA values for paper substrates treated with 0.5 gsm of sodium chloride. Line 1016 is a fitted plot of EA values for paper substrates treated with 0.5 gsm of the 3:1 sodium chloride:calcium chloride salt blend. Plot 1004 (no salt) and 1008 (0.5 gsm of calcium chloride) provide essentially linear curves of edge acuity (EA) values. By comparison, plots 1008 (0.5 gsm of sodium chloride) and 1012 (0.5 gsm 3:1 sodium chloride:calcium chloride salt blend) provide logarithmic curves of edge acuity (EA) values, suggesting that sodium chloride may not be as effective for paper substrates having lower HST values (e.g., 20 seconds) in reducing edge acuity (i.e., lower EA values) as the multivalent calcium chloride, but may provide slight edge acuity improvement for paper substrates having intermediate HST values (e.g., 61, 157, and 218 seconds).

Example 10

Using the lab trial coating procedure described above, paper substrates having HST values of 20, 61, 157, and 218 seconds are treated with water (no salt), Composition 1 (0.25 gsm of calcium chloride, see Table 1), Coating Composition 2 (0.5 gsm of calcium chloride, see Table 1) or Coating Composition 3 (1.0 gsm of calcium chloride, see Table 1). The edge acuity (EA) is determined for each paper substrate. The results are shown in Table 12 below:

TABLE 12

| Paper Substrate | HST Value (seconds) | Salt | Edge Acuity (EA) |
|---|---|---|---|
| A | 20 | No | 26.19 |
| A | 20 | 0.25 gsm $CaCl_2$ | 13.81 |
| A | 20 | 0.5 gsm $CaCl_2$ | 9.06 |
| A | 20 | 1.0 gsm $CaCl_2$ | 8.50 |
| B | 61 | No | 18.30 |
| B | 61 | 0.25 gsm $CaCl_2$ | 8.73 |
| B | 61 | 0.5 gsm $CaCl_2$ | 8.12 |
| B | 61 | 1.0 gsm $CaCl_2$ | 6.75 |
| C | 157 | No | 12.56 |
| C | 157 | 0.25 gsm $CaCl_2$ | 6.81 |
| C | 157 | 0.5 gsm $CaCl_2$ | 7.00 |
| C | 157 | 1.0 gsm $CaCl_2$ | 6.35 |
| D | 218 | No | 5.96 |
| D | 218 | 0.25 gsm $CaCl_2$ | 6.25 |
| D | 218 | 0.5 gsm $CaCl_2$ | 5.86 |
| D | 218 | 1.0 gsm $CaCl_2$ | 5.86 |

Figure 11:
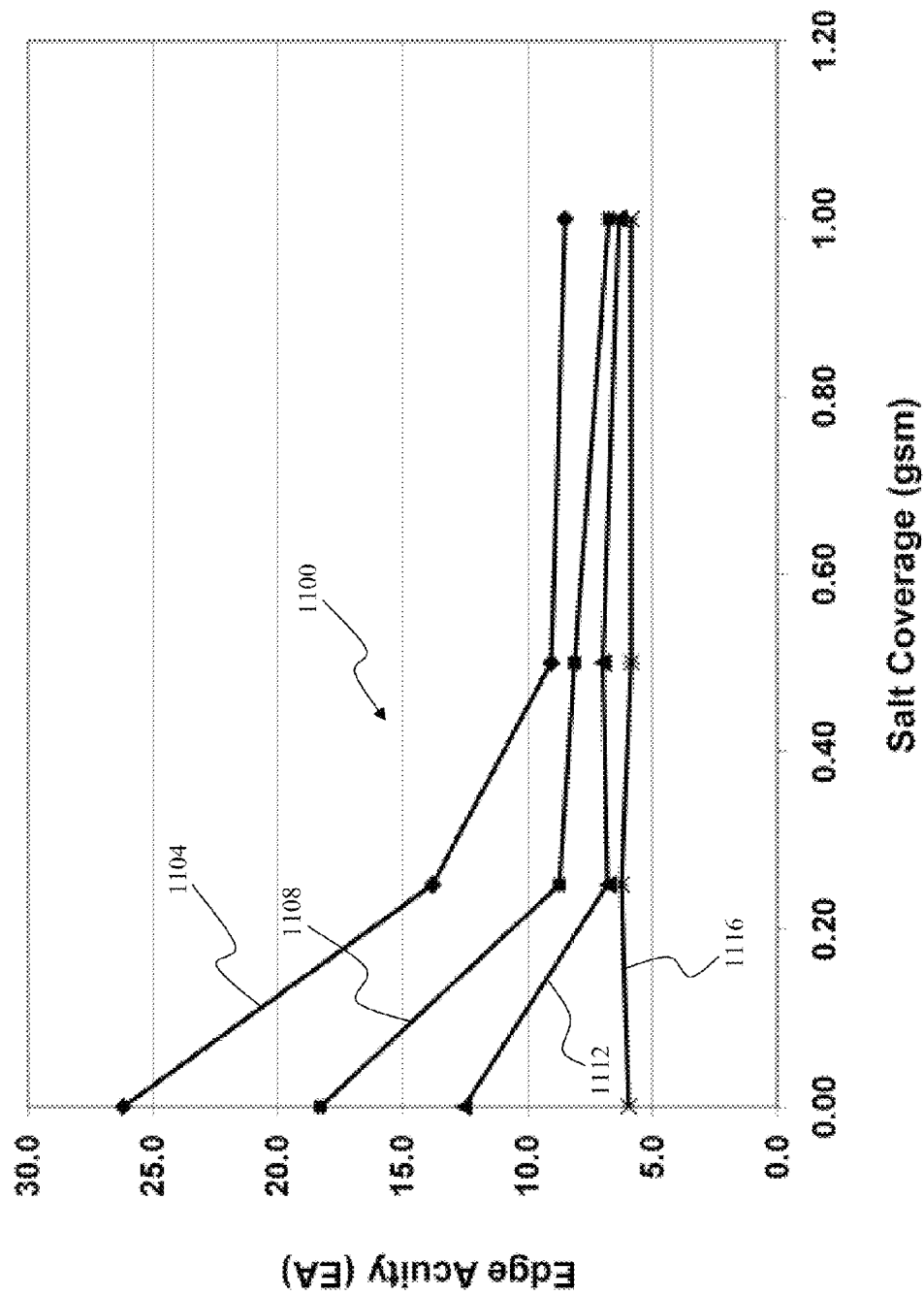
FIG. 11 shows graphical plots of edge acuity (EA), versus varying calcium chloride salt coverage (in gsm), for paper substrates having differing HST values.

FIG. 11 shows graphical plots, indicated generally as 1100, of the results from Table 12 above of the edge acuity (EA) values, versus calcium chloride salt coverage, for the paper substrates having HST values of 20 seconds (diamonds), 61 seconds (squares), 157 seconds (triangles) and 218 seconds (asterisks). Line 1104 is the plot of the EA values for the 20 second HST value paper substrate over the calcium chloride salt coverage range. Line 1108 is the plot of the EA values for the 61 second HST value paper substrate over the calcium chloride salt coverage range. Line 1112 is the plot of the EA values for the 157 second HST value paper substrate over the calcium chloride salt coverage range. Line 1116 is the plot of the EA values for the 218 second HST value paper substrate over the calcium chloride salt coverage range. A comparison of plots 1104, 1108, 1112, and 1116 shows that edge acuity may improve (i.e., EA values decrease) with treatment of the paper substrates having intermediate HST values of 61 and 157 seconds with 0.25 gsm of calcium chloride, but that edge acuity minimally improves further, if at all, by increasing coverage to 0.5 gsm or 1.0 gsm for paper substrates having intermediate HST values of 61 and 157 seconds. In addition, the paper substrate having an intermediate HST value of 218 seconds has a relatively low EA values such that treatment with calcium chloride may provide minimal, if any, improvement in edge acuity.

Example 11

Using the lab trial coating procedure described above, paper substrates having HST values of 20, 61, 157, and 218 seconds are treated with water (no salt), Composition 4 (0.25 gsm of sodium chloride, see Table 1), Coating Composition 5 (0.5 gsm of sodium chloride, see Table 1) or Coating Composition 6 (1.0 gsm of sodium chloride, see Table 1). The edge acuity (EA) is determined for each paper substrate. The results are shown in Table 13 below:

TABLE 13

| Paper Substrate | HST Value (seconds) | Salt | Edge Acuity (EA) |
|---|---|---|---|
| A | 20 | No | 26.19 |
| A | 20 | 0.25 gsm NaCl | 30.42 |
| A | 20 | 0.5 gsm NaCl | 29.06 |

TABLE 13-continued

| Paper Substrate | HST Value (seconds) | Salt | Edge Acuity (EA) |
|---|---|---|---|
| A | 20 | 1.0 gsm NaCl | 25.07 |
| B | 61 | No | 18.30 |
| B | 61 | 0.25 gsm NaCl | 14.49 |
| B | 61 | 0.5 gsm NaCl | 14.70 |
| B | 61 | 1.0 gsm NaCl | 17.76 |
| C | 157 | No | 12.56 |
| C | 157 | 0.25 gsm NaCl | 20.63 |
| C | 157 | 0.5 gsm NaCl | 13.10 |
| C | 157 | 1.0 gsm NaCl | 9.25 |
| D | 218 | No | 5.96 |
| D | 218 | 0.25 gsm NaCl | 6.22 |
| D | 218 | 0.5 gsm NaCl | 6.13 |
| D | 218 | 1.0 gsm NaCl | 6.10 |

Figure 12:
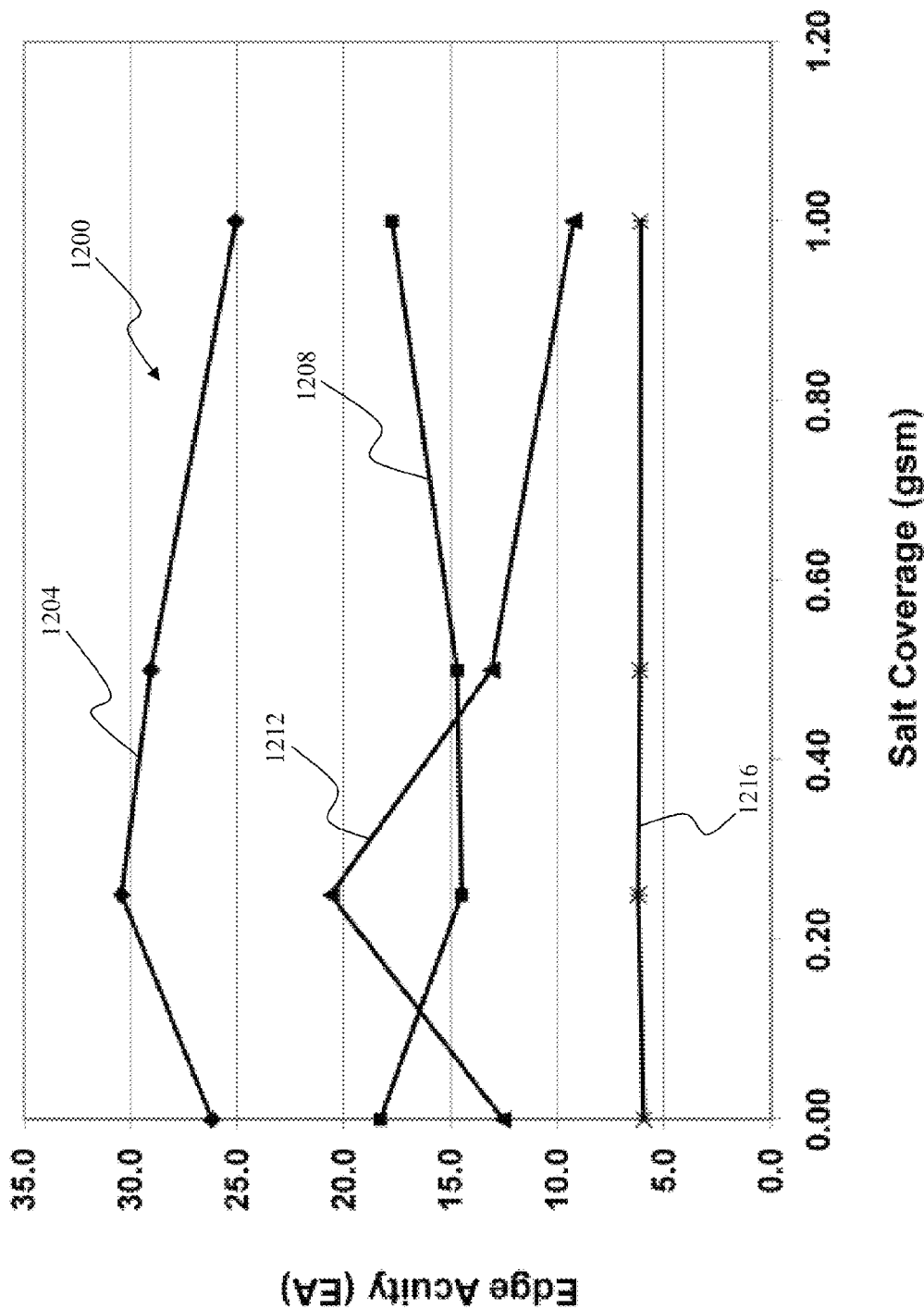
FIG. 12 shows graphical plots of edge acuity (EA), versus varying sodium chloride salt coverage (in gsm), for paper substrates having differing HST values.

FIG. 12 shows graphical plots, indicated generally as 1200, of the results from Table 13 above of edge acuity (EA) values, versus sodium chloride salt coverage, for paper substrates having HST values of 20 seconds (diamonds), 61 seconds (squares), 157 seconds (triangles) and 218 seconds (asterisks). Line 1204 is the plot of the EA values for the 20 second HST value paper substrate over the sodium chloride salt coverage range. Line 1208 is the plot of the EA values for the 61 second HST value paper substrate over the sodium chloride salt coverage range. Line 1212 is the plot of the EA values for the 157 second HST value paper substrate over the sodium chloride salt coverage range. Line 1216 is the plot of the EA values for the 218 second HST value paper substrate over the sodium chloride salt coverage range. A comparison of plots 1204, 1208, 1212, and 1216 shows that treatment with sodium chloride may be ineffective in improving edge acuity (i.e., lowering EA values) for paper substrates having at very low HST values (e.g., 20 seconds), but may improve edge acuity (i.e., lower EA values) for paper substrates having intermediate HST values of 61 and 157 seconds. Similar to what is shown in FIG. 11 for treatment with calcium chloride, FIG. 12 suggests that treatment of the paper substrate having an intermediate HST value of 218 seconds with sodium chlorides may provide minimal, if any, improvement in edge acuity.

Example 12

Using the lab trial coating procedure described above, paper substrates having HST values of 20, 61, 157, and 218 seconds are treated with water (no salt), Coating Composition 7 (0.25 gsm of a 3:1 sodium chloride:calcium chloride salt blend, see Table 1), Coating Composition 8 (0.5 gsm of a 3:1 sodium chloride:calcium chloride salt blend, see Table 1) or Coating Composition 9 (1.0 gsm of a 3:1 sodium chloride:calcium chloride salt blend, see Table 1). The edge acuity (EA) is determined for each paper substrate. The results are shown in Table 14 below:

TABLE 14

| Paper Substrate | HST Value (seconds) | Salt | Edge Acuity (EA) |
|---|---|---|---|
| A | 20 | No | 26.19 |
| A | 20 | 0.25 gsm Salt Blend | 26.97 |
| A | 20 | 0.5 gsm Salt Blend | 22.92 |
| A | 20 | 1.0 gsm Salt Blend | 15.51 |
| B | 61 | No | 18.30 |
| B | 61 | 0.25 gsm Salt Blend | 13.17 |
| B | 61 | 0.5 gsm Salt Blend | 10.20 |
| B | 61 | 1.0 gsm Salt Blend | 10.23 |
| C | 157 | No | 12.56 |
| C | 157 | 0.25 gsm Salt Blend | 7.52 |
| C | 157 | 0.5 gsm Salt Blend | 7.62 |
| C | 157 | 1.0 gsm Salt Blend | 7.21 |
| D | 218 | No | 5.96 |
| D | 218 | 0.25 gsm Salt Blend | 6.85 |
| D | 218 | 0.5 gsm Salt Blend | 7.39 |
| D | 218 | 1.0 gsm Salt Blend | 6.18 |

Figure 13:
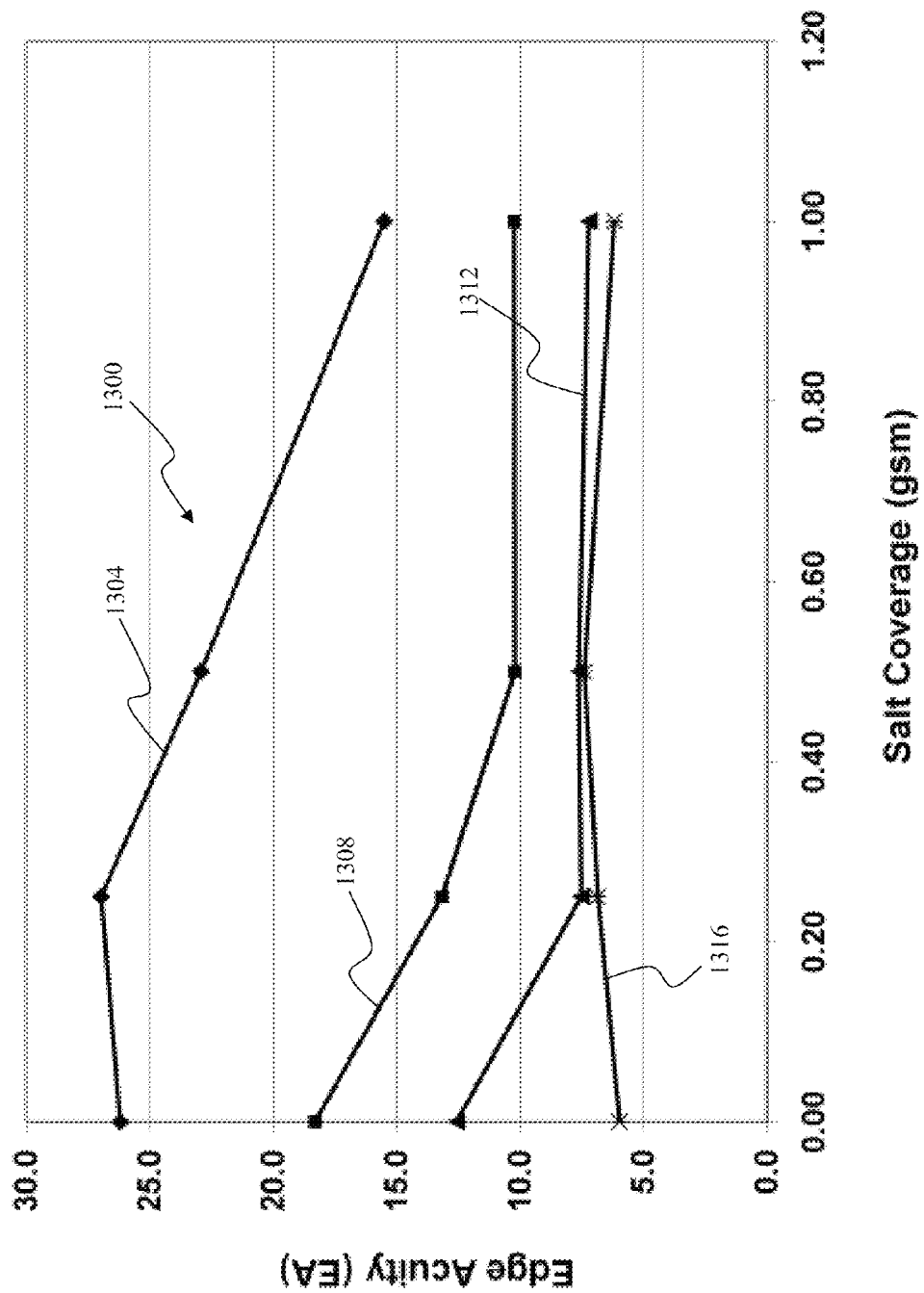
FIG. 13 shows graphical plots of edge acuity (EA), versus a varying 3:1 sodium chloride:calcium chloride salt blend coverage (in gsm), for paper substrates having differing HST values.

FIG. 13 shows graphical plots, indicated generally as 1100, of the results from Table 14 above of edge acuity (EA) values, versus salt blend coverage, for paper substrates having HST values of 20 seconds (diamonds), 61 seconds (squares), 157 seconds (triangles) and 218 seconds (asterisks). Line 1304 is the plot of the EA values for the 20 second HST value paper substrate over the salt blend coverage range. Line 1308 is the plot of the EA values for the 61 second HST value paper substrate over the salt blend coverage range. Line 1312 is the plot of the EA values for the 157 second HST value paper substrate over the salt blend coverage range. Line 1316 is the plot of the EA values for the 218 second HST value paper substrate over the salt blend coverage range. A comparison of plots 1304, 1308, 1312, and 1316 shows that edge acuity may improve (i.e., EA values decrease) with treatment of the paper substrates with the 3:1 sodium chloride:calcium chloride salt blend, but that edge acuity minimally improves further, if at all, by increasing coverage from 0.5 gsm to 1.0 gsm for the paper substrate having an intermediate HST value of 61, as well as from 0.25 gsm to 0.5 or 1.0 gsm for the for paper substrate having an intermediate HST value of 157 second. Similar to what is shown in FIG. 11 (treatment with calcium chloride only) and FIG. 12 (treatment with sodium chloride only), FIG. 13 suggests that treatment of the paper substrate having an intermediate HST value of 218 seconds with the 3:1 sodium chloride:calcium chloride salt blend may provide minimal, if any, improvement in edge.

All documents, patents, journal articles and other materials cited in the present application are hereby incorporated by reference.

Although the present invention has been fully described in conjunction with several embodiments thereof with reference to the accompanying drawings, it is to be understood that various changes and modifications may be apparent to those skilled in the art. Such changes and modifications are to be understood as included within the scope of the present invention as defined by the appended claims, unless they depart therefrom.

What is claimed is:

1. An article comprising:
a paper substrate having a first surface and a second surface;
an internal paper sizing agent present in an amount sufficient to impart to the paper substrate an HST value of from about 50 to about 250 seconds; and
a metal salt drying agent comprising at least about 20% by weight of one or more monovalent metal drying salts, wherein the metal salt drying agent is present on at least one of the first and second surfaces in an amount sufficient to provide a percent ink transferred ("IT %") value equal to or less than about 65% and to provide a black print density value of at least about 1.45.

2. The article of claim 1, wherein the metal salt drying agent is present on both the first and second surfaces.

3. The article of claim 2, wherein the metal salt drying agent is present in amount sufficient to provide coverage on each of the first and second surfaces of from about 0.2 to about 1.2 gsm of the metal salt drying agent.

4. The article of claim 2, wherein the metal salt drying agent is present in amount sufficient to provide coverage on each of the first and second surfaces of from about 0.5 to about 1 gsm of the metal salt drying agent.

5. The article of claim 3, wherein the monovalent metal drying salts comprise sodium chloride.

6. The article of claim 2, wherein the metal salt drying agent comprises at least about 50% by weight monovalent metal drying salts.

7. The article of claim 6, wherein the metal salt drying agent comprises from about 50 to about 90% by weight monovalent metal drying salts.

8. The article of claim 7, wherein the metal salt drying agent comprises from about 60 to about 80% by weight monovalent metal drying salts.

9. The article of claim 1, wherein the monovalent metal drying salts comprise one or more of sodium chloride, sodium acetate, sodium carbonate, sodium bicarbonate, sodium hydroxide, sodium silicates, sodium sulfate, sodium sulfite, sodium nitrate, sodium bromide, potassium chloride, potassium acetate, potassium carbonate, potassium bicarbonate, potassium hydroxide, potassium silicates, potassium sulfate, potassium sulfite, potassium nitrate, or potassium bromide.

10. The article of claim 9 wherein the metal salt drying agent comprises a mixture of monovalent metal drying salts and multivalent metal drying salts, wherein the multivalent metal drying salts comprise one or more of calcium chloride, calcium acetate, calcium hydroxide, calcium nitrate, calcium sulfate, calcium sulfite, magnesium chloride, magnesium acetate, magnesium nitrate, magnesium sulfate, magnesium sulfite, aluminum chloride, aluminum nitrate, aluminum sulfate, aluminum chlorohydrate, sodium aluminum sulfate, vanadium chloride.

11. The article of claim 10, wherein the monovalent metal drying salts comprise sodium chloride.

12. The article of claim 11, wherein the metal drying agent comprises a mixture of sodium chloride and calcium chloride in a weight ratio of from about 1:4 to about 9:1 sodium chloride:calcium chloride.

13. The article of claim 12, wherein the weight ratio of sodium chloride:calcium chloride is from about 1:1 to about 9:1.

14. The article of claim 13, wherein the weight ratio of sodium chloride:calcium chloride is from about 3:2 to about 4:1.

15. The article of claim 1, wherein the metal salt drying agent is present on the at least one of the first and second surfaces in an amount sufficient to provide an IT % value equal to or less than about 50%.

16. The article of claim 15, wherein the metal salt drying agent is present on the at least one of the first and second surfaces in an amount sufficient to provide a IT % value equal to or less than about 40%.

17. The article of claim 1, wherein the metal salt drying agent is present on the at least one of the first and second surfaces provides a black print density value of at least about 1.50.

18. The article of claim 17, wherein the metal salt drying agent is present on the at least one of the first and second surfaces provides a black print density value of at least about 1.60.

19. The article of claim 1, wherein the metal salt drying agent is present on the at least one of the first and second surfaces provides an edge acuity (EA) value of less than about 15.

20. The article of claim 19, wherein the metal salt drying agent is present on the at least one of the first and second surfaces provides an edge acuity (EA) value of less than about 10.

21. The article of claim 1, wherein the internal paper sizing agent is present in an amount sufficient to impart to the paper substrate an HST value of from about 70 to about 160 seconds.

22. A method comprising the following steps of:
(a) providing a paper substrate having a first surface and a second surface, wherein an internal paper sizing agent is present in an amount sufficient to impart to the paper substrate an HST value of from about 50 to about 250 seconds; and
(b) treating the paper substrate with a coating composition comprising a metal salt drying agent comprising at least about 20% by weight of one or more monovalent metal drying salts, wherein the metal salt drying agent is present on at least one of the first and second surfaces in an amount sufficient to provide a percent ink transferred ("IT %") value equal to or less than about 65% and to provide a black print density value of at least about 1.45.

23. The method of claim 22, wherein step (b) is carried out by applying the coating composition comprising a metal salt drying agent comprises at least about 50% by weight monovalent metal drying salts.

24. The method of claim 23, wherein step (b) is carried out by applying the coating composition to the at least one of the first and second surfaces by using a size press.

25. The method of claim 23, wherein step (b) is carried out by applying the coating composition to both the first and second surfaces.

26. The method of 25, wherein step (b) is carried out by applying the coating composition so as to provide coverage on each of the first and second surfaces of from about 0.2 to about 1.2 gsm of the metal salt drying agent.

27. The method of 26, wherein step (b) is carried out by applying the coating composition so as to provide coverage on each of the first and second surfaces of from about 0.5 to about 1 gsm of the metal salt drying agent.

28. The method of claim 27, wherein the monovalent metal drying salts comprise sodium chloride.

29. The method of claim 25, wherein step (b) is carried out by applying to each of the first and second surfaces a coating composition which comprises a mixture of sodium chloride and calcium chloride in a weight ratio of from about 4:1 to about 9:1 sodium chloride:calcium chloride.

30. The method of claim 29, wherein step (b) is carried out by applying to each of the first and second surfaces a coating composition which comprises a mixture of sodium chloride and calcium chloride in a weight ratio of from about 1:1 to about 9:1 sodium chloride:calcium chloride.

31. The method of claim 30, wherein step (b) is carried out by applying to each of the first and second surfaces a coating composition which comprises a mixture of sodium chloride and calcium chloride in a weight ratio of from about 3:2 to about 4:1 sodium chloride:calcium chloride.

32. The method of claim 25, wherein step (b) is carried out by applying to each of the first and second surfaces a coating composition so as to provide an amount of metal salt drying agent sufficient to impart an IT % value equal to or less than about 50% to each of the first and second surfaces.

33. The method of claim 32, wherein step (b) is carried out by applying to each of the first and second surfaces a coating composition so as to provide an amount of metal salt drying agent sufficient to impart an IT % value equal to or less than about 40% to each of the first and second surfaces.

34. The method of claim 25, wherein step (b) is carried out by applying to each of the first and second surfaces a coating composition comprising a metal salt drying agent which imparts a black print density value of at least about 1.50 to each of the first and second surfaces.

35. The method of claim 34, wherein step (b) is carried out by applying to each of the first and second surfaces a coating composition comprising a metal salt drying agent which imparts a black print density value of at least about 1.60 to each of the first and second surfaces.

36. The method of claim 23, wherein the internal paper sizing agent is present in an amount sufficient to impart to the paper substrate of step (a) an HST value of from about 70 to about 160 seconds.

* * * * *